(12) United States Patent
Murabayashi et al.

(10) Patent No.: US 8,363,726 B2
(45) Date of Patent: Jan. 29, 2013

(54) ELECTRONIC APPARATUS, MOTION VECTOR DETECTING METHOD, AND PROGRAM THEREFOR

(75) Inventors: Noboru Murabayashi, Saitama (JP); Hiroshige Okamoto, Kanagawa (JP)

(73) Assignee: Sony Corporation (JP)

( * ) Notice: Subject to any disclaimer, the term of this patent is extended or adjusted under 35 U.S.C. 154(b) by 1212 days.

(21) Appl. No.: 12/221,240

(22) Filed: Jul. 31, 2008

(65) Prior Publication Data

US 2009/0041126 A1 Feb. 12, 2009

(30) Foreign Application Priority Data

Aug. 7, 2007 (JP) ................. P2007-205755

(51) Int. Cl.
*H04N 7/12* (2006.01)
(52) U.S. Cl. ................................. 375/240.16
(58) Field of Classification Search ............. 375/240.01–240.29; *H04N 7/12*
See application file for complete search history.

(56) References Cited

U.S. PATENT DOCUMENTS

| | | | | |
|---|---|---|---|---|
| 6,249,612 B1 * | 6/2001 | Ogura | ............ | 382/236 |
| 6,304,604 B1 * | 10/2001 | Adiletta et al. | .......... | 375/240.18 |
| 7,227,897 B2 | 6/2007 | Nishibori et al. | | |
| 2003/0072374 A1 * | 4/2003 | Sohm | ............ | 375/240.16 |
| 2010/0202532 A1 * | 8/2010 | Webb | ............ | 375/240.16 |

FOREIGN PATENT DOCUMENTS

| | | | |
|---|---|---|---|
| JP | 02157980 | A | 6/1990 |
| JP | 09044681 | A | 2/1997 |
| JP | 2000267799 | A | 9/2000 |
| JP | 2003-299040 | A | 10/2003 |
| JP | 2004260545 | A | 9/2004 |

OTHER PUBLICATIONS

Office Action from Japanese Application No. 2007-205755, dated Nov. 8, 2011.

* cited by examiner

*Primary Examiner* — Jay Patel
*Assistant Examiner* — Richard Torrente
(74) *Attorney, Agent, or Firm* — Lerner, David, Littenberg, Krumholz & Mentlik, LLP

(57) ABSTRACT

An electronic apparatus includes an extracting unit, a retrieving unit, a detecting unit, and a controlling unit. The extracting unit extracts a first block at a first position of a first frame image from plural frame images constituting video data. The retrieving unit retrieves, from a retrieval region within a second frame image from among the plural frame images, a second block between which the first block has a smallest residual value, the second and first frame images having a first time length therebetween. The detecting unit detects a first motion vector between the first and second blocks. The controlling unit controls the detecting unit so that detection of the first motion vector is regulated when the second block is retrieved at a third position apart from the second position of the second frame image corresponding to the first position by a first threshold or more.

3 Claims, 31 Drawing Sheets

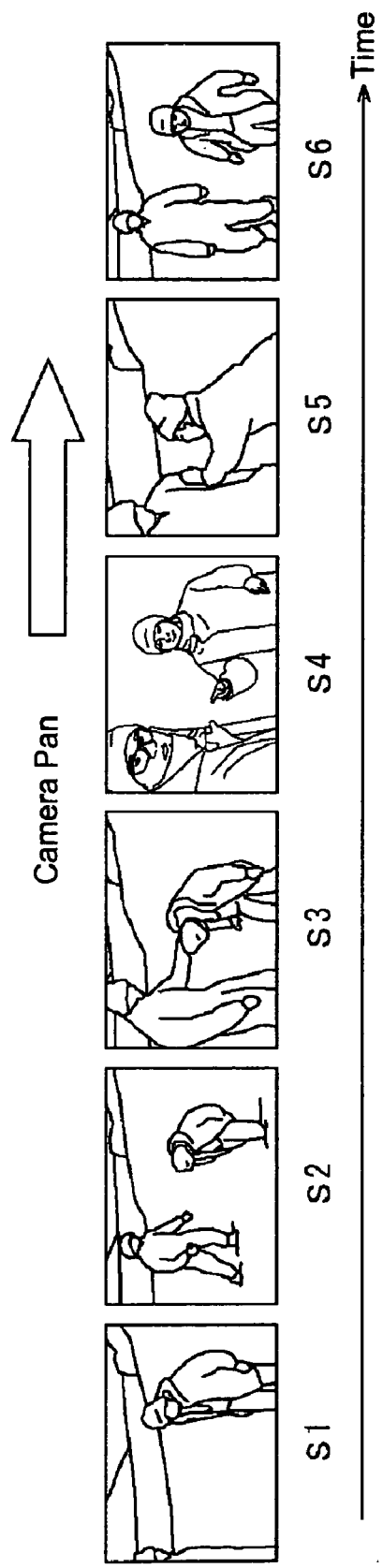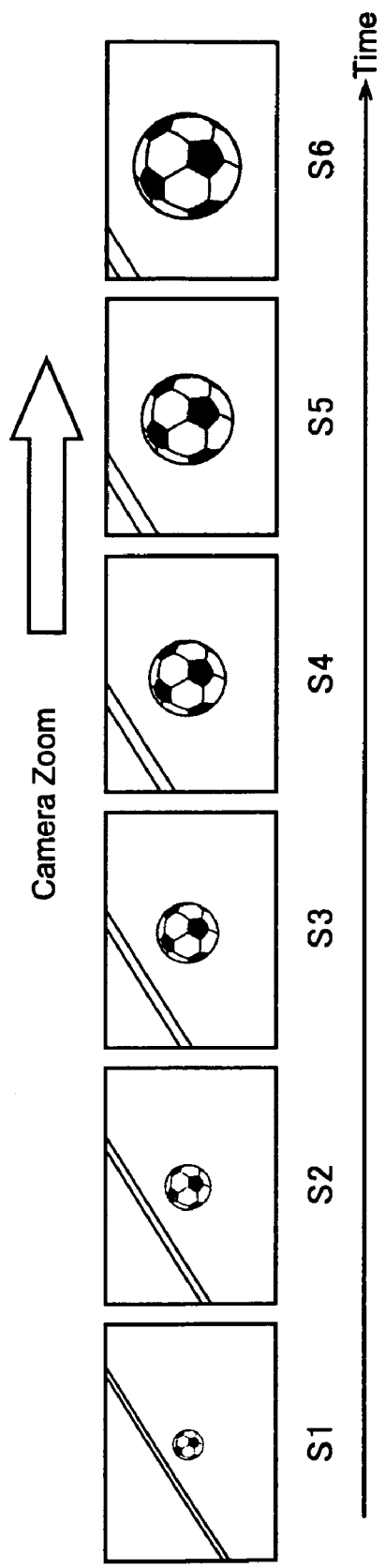
FIG.2A
FIG.2B

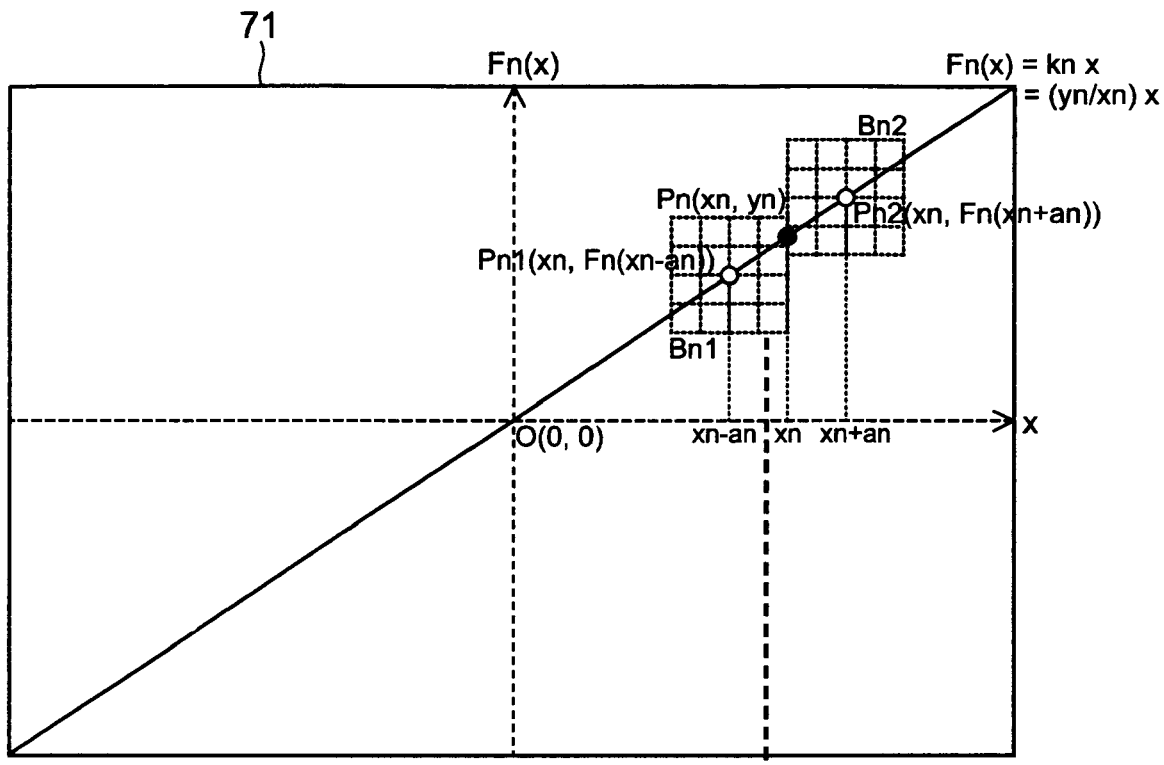
FIG.16A
FIG.16B
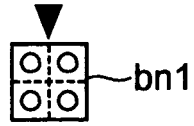
FIG.16C $$\begin{bmatrix} x \\ y \end{bmatrix} = \begin{bmatrix} \cos\theta & \sin\theta \\ -\sin\theta & \cos\theta \end{bmatrix} \begin{bmatrix} Zx & 0 \\ 0 & Zy \end{bmatrix} \begin{bmatrix} x0 \\ y0 \end{bmatrix} + \begin{bmatrix} Px \\ Py \end{bmatrix}$$

$$\fallingdotseq \begin{bmatrix} 1 & \theta \\ -\theta & 1 \end{bmatrix} \begin{bmatrix} Zx & 0 \\ 0 & Zy \end{bmatrix} \begin{bmatrix} x0 \\ y0 \end{bmatrix} + \begin{bmatrix} Px \\ Py \end{bmatrix}$$

$$= \begin{bmatrix} Zx & \theta Zy \\ -\theta Zx & Zy \end{bmatrix} \begin{bmatrix} x0 \\ x0 \end{bmatrix} + \begin{bmatrix} Px \\ Py \end{bmatrix}$$

$$= \begin{bmatrix} Zx\,x0 + \theta Zy\,y0 + Px \\ -\theta Zx\,x0 + Zy\,y0 + Px \end{bmatrix}$$

$$= \begin{bmatrix} a0 + a1\,x0 + a2\,y0 \\ b0 + b1\,x0 + b2\,y0 \end{bmatrix}$$

a0 = Px           b0 = Py
a1 = Zx           b1 = $\theta$ Zx = -a1 $\theta$
a2 = $\theta$ Zy = b2 $\theta$    b2 = Zy

FIG.20

$$\begin{bmatrix} xm \\ ym \end{bmatrix} = \begin{bmatrix} a0 + a1\,xn + a2\,yn \\ b0 + b1\,yn + b2\,yn \end{bmatrix}$$

(n=0, 1, 2, 3, 4, 5, ······, nmax)  mmax=63

Explanatory Variable
    xn : x coordinate of detecting target point Pn
    yn : y coordinate of detecting target point Pn Explained Variable
    xm : x coordinate of detecting target point Pm
    ym : y coordinate of detecting target point Pm

FIG.21

| Judging Feature Type | Dpan | | Dtilt | | Dzoom | | Dbure | | Dcut | | Dfade | |
|---|---|---|---|---|---|---|---|---|---|---|---|---|
| | 0 | 1 | 0 | 1 | 0 | 1 | 0 | 1 | 0 | 1 | 0 | 1 |
| Pan | | O | | | | | | | | | | |
| Tilt | | | | O | | | | | | | | |
| Zoom | | | | | | O | | | | | | |
| Shake | | | | | | | | O | | | | |
| Cut | | | | | | | | | | O | | |
| Fade | | | | | | | | | | | | O |

FIG.27

ELECTRONIC APPARATUS, MOTION VECTOR DETECTING METHOD, AND PROGRAM THEREFOR

CROSS-REFERENCE TO RELATED APPLICATIONS

The present application claims priority from Japanese Patent Application No. JP 2007-205755, filed in the Japanese Patent Office on Aug. 7, 2007, the entire content of which is incorporated herein by reference.

BACKGROUND OF THE INVENTION

1. Field of the Invention

The present invention relates to an electronic apparatus capable of detecting a motion vector from a video content, a motion vector detecting method for the electronic apparatus, and a program therefor.

2. Description of the Related Art

In recent years, in electronic apparatuses such as a recording/reproducing apparatus including an HDD (Hard Disk Drive) recorder, a DVD (Digital Versatile Disk) recorder, and a BD (Blu-ray Disc) recorder, and a PC (Personal Computer), capacities of recording media are expanded and amounts of contents to be recorded and stored are increased due to diversification of contents and the like. As one technique to allow users to effectively view such a large amount of contents, there is a technique of detecting a motion feature of a camera (hereinafter, referred to as camera operational feature) (e.g., pan, tilt, and zoom) that has shot a video content, and extracting a feature section within the video content based on the detected feature, to thereby reproduce a highlight scene.

Such a camera operational feature can be detected by detecting a motion vector using block-matching processing. The block-matching processing involves, for example, extracting a basis block from a basis frame within the video content, and moving a retrieval block within a retrieval range in a retrieval frame that has a predetermined frame interval with respect to the basis frame, to retrieve a position at which a similarity degree becomes maximum, that is, a position at which a matching differential becomes minimum.

However, in a case where a camera that has shot the video content is moved fast, for example, the block corresponding to the basis block may be retrieved outside the retrieval range. In this case, because it is difficult to determine if the block corresponding to the basis block is within the retrieval range or outside the retrieval range, when the block corresponding to the basis block is outside the retrieval range, a position at which the similarity degree becomes maximum inside the retrieval range may be detected regardless of the fact that a current movement position is not inside the retrieval range. As a result, a motion vector different from that of the actual movement may be erroneously detected. Further, when a scene change occurs between the basis frame and the retrieval frame, for example, although no motion vector normally exists between both of the frames without doubt, the motion vector may be erroneously detected in this case, too.

Regarding the problems described above, Japanese Patent Application Laid-open No. 2003-299040 (FIG. 6 etc.) (hereinafter, referred to as Patent Document 1) discloses the following technique. In this technique, an absolute differential sum between a basis block cut out from a current frame and a retrieval block that moves within a retrieval range of a reference frame that is one frame after the current frame is calculated, and a pixel position of the retrieval block at which the absolute differential sum becomes minimum is retrieved, to thus obtain a motion vector between a pixel position of the retrieval block and that of the basis block. In this case, when the pixel position at which the absolute differential sum becomes minimum is outside the retrieval range, a vector amount of the obtained motion vector is corrected so that the above-mentioned pixel position is located inside the retrieval range.

SUMMARY OF THE INVENTION

In Patent Document 1, however, the retrieval block that has moved out of the retrieval range is detected by providing an expanded retrieval range, to which the retrieval range is additionally expanded, outside the retrieval range and moving the retrieval block to the expanded retrieval range. Thus, in the technique disclosed in Patent Document 1, the expanded retrieval range is considered as the substantial retrieval range, and when the retrieval block moves out of the expanded retrieval range, an actual motion vector may hardly be detected, thus causing erroneous detection.

In view of the above-mentioned circumstances, there is a need for an electronic apparatus capable of preventing erroneous detection of a motion vector, a motion vector detecting method for the electronic apparatus, and a program therefor.

According to an embodiment of the present invention, there is provided an electronic apparatus including an extracting means, a retrieving means, a detecting means, and a controlling means. The extracting means extracts a first block at a first position of a first frame image from among a plurality of frame images constituting video data. The retrieving means retrieves, from a retrieval region within a second frame image from among the plurality of frame images, a second block between which the first block has a smallest residual value, the second frame image and the first frame image having a first time length therebetween. The detecting means detects a first motion vector between the first block and the second block. The controlling means controls the detecting means so that detection of the first motion vector is regulated when the second block is retrieved at a third position apart from the second position of the second frame image corresponding to the first position by a first threshold or more.

The electronic apparatus used herein refers to an electrical appliance such as a recording/reproducing apparatus including an HDD recorder, a DVD recorder, and a BD recorder, a PC, a television apparatus, a game machine, and a cellular phone. Examples of the first time length and the second time length include 1-frame time, 4-frame time, 10-frame time, 20-frame time, and 30-frame time. Moreover, the threshold in this case is, for example, ±8 pixels respectively in an X direction (horizontal direction) and a Y direction (vertical direction), but is not limited thereto.

With this structure, the detection of the first motion vector is regulated when the second block is retrieved at the third position apart from the second position by the first threshold or more since the retrieval position thereof is assumed to be inaccurate. Therefore, erroneous detection of the motion vector can be prevented regardless of whether the second block is outside the retrieval region of the second frame.

In the electronic apparatus according to the embodiment of the present invention, the controlling means may regulate the detection of the first motion vector when the second block is retrieved at the third position and the residual value is a second threshold or more.

Accordingly, even if a movement amount of the second block is smaller than the first threshold, when the residual value is the second threshold or more, that is, when the second block unsimilar to the first block is retrieved, it is possible to regulate the detection of the first motion vector, resulting in enhancement of accuracy in detecting a motion vector.

In the electronic apparatus according to the embodiment of the present invention, the retrieving means may retrieve, from a retrieval region within a third frame image, a third block between which the first block has a smallest residual value, the third frame image and the first frame image having a second time length therebetween different from the first time length. In addition, the detecting means may detect a second motion vector between the first block and the third block, and detect a motion feature within the video data based on the first motion vector and the second motion vector. Furthermore, the controlling means may control the detecting means so that, when the detection of the first motion vector is regulated, the motion feature is detected based on the second motion vector.

The motion feature used herein refers to, for example, a video feature caused when operating a camera, such as pan, tilt, zoom, and shake caused by a hand movement. The motion feature can be detected by, for example, carrying out a multiple regression analysis using an affine transformation model based on each of the motion vectors, and calculating affine coefficients that indicate the respective motion features. Accordingly, when determined that the movement amount and residual value of the second block is inaccurate in detecting the motion feature based on the first and second motion vectors, the first motion vector is not detected and the motion feature is detected based solely on the second motion vector, thus improving precision in detecting the motion feature.

In the electronic apparatus according to the embodiment of the present invention, the retrieving means may retrieve, from a retrieval region within a fourth frame image, a fourth block between which the first block has a smallest residual value, the fourth frame image and the first frame image having a third time length therebetween different from the first time length and the second time length. In addition, the detecting means may detect a third motion vector between the first block and the fourth block, estimate a fourth motion vector based on the first motion vector, the second motion vector, and the third motion vector, the fourth motion vector assumed to be detected within a fifth frame image between which the first frame image has a fourth time length longer than any of the first time length, the second time length, and the third time length, and detect the motion feature based on the estimated fourth motion vector. Furthermore, the controlling means may control the detecting means so that, when the detection of the first motion vector is regulated, the fourth motion vector is estimated based on the second motion vector and the third motion vector.

Accordingly, because it is possible to detect the motion vectors at a plurality of frame intervals different in time lengths and estimate, based on the detected motion vectors, a motion vector at a time length longer than the time lengths at which the respective motion vectors have been detected, a dynamic range of the motion vectors can be expanded and, as compared to the case where the motion feature is detected based merely on the detected motion vectors, resolution performance of data can be improved and the motion feature can be detected with higher precision. Also, at the same time, when determined that the movement amount and residual value of the second block are inaccurate, detection data thereof is not used in the motion vector estimating processing, thus additionally improving precision in detecting the motion feature.

In this case, in the electronic apparatus according to the embodiment of the present invention, the detecting means may include means for calculating a first gradient based on the first motion vector and the first time length, means for calculating a second gradient based on the second motion vector and the second time length, means for calculating a third gradient based on the third motion vector and the third time length, means for calculating a fourth gradient by averaging the calculated first gradient, second gradient, and third gradient, and means for estimating the fourth motion vector based on the calculated fourth gradient. In addition, the controlling means may control the detecting means so that, when the detection of the first motion vector is regulated, the fourth gradient is calculated by averaging the second gradient and the third gradient.

Accordingly, by estimating the fourth motion vector based on the fourth gradient calculated by averaging the gradients of the motion vectors at the respective time lengths, it is possible to accurately estimate the fourth motion vector. In addition, when determined that the movement amount and residual value of the second block are inaccurate, detection data thereof is not used in averaging the gradients, thus additionally improving accuracy in estimating the fourth motion vector.

In the electronic apparatus according to the embodiment of the present invention, the detecting means may calculate the first gradient, the second gradient, and the third gradient as ratios of values respectively obtained by dividing the first time length, the second time length, and the third time length by a time length of the first frame image, with respect to the first motion vector, the second motion vector, and the third motion vector, respectively.

Accordingly, even when frame rates of the frame images are differed from each other due to the video data, the different frame rates can be normalized. Thus, it is possible to accurately estimate the fourth motion vector.

According to another embodiment of the present invention, there is provided a motion vector detecting method including: extracting a first block at a first position of a first frame image from among a plurality of frame images constituting video data; retrieving, from a retrieval region within a second frame image from among the plurality of frame images, a second block between which the first block has a smallest residual value, the second frame image and the first frame image having a first time length therebetween; detecting a first motion vector between the first block and the second block; and controlling the detection so that detection of the first motion vector is regulated when the second block is retrieved at a third position apart from the second position of the second frame image corresponding to the first position by a first threshold or more.

According to another embodiment of the present invention, there is provided a program for causing an electronic apparatus to execute the steps of: extracting a first block at a first position of a first frame image from among a plurality of frame images constituting video data; retrieving, from a retrieval region within a second frame image from among the plurality of frame images, a second block between which the first block has a smallest residual value, the second frame image and the first frame image having a first time length therebetween; detecting a first motion vector between the first block and the second block; and controlling the detection so that detection of the first motion vector is regulated when the second block is retrieved at a third position apart from the second position of the second frame image corresponding to the first position by a first threshold or more.

According to another embodiment of the present invention, there is provided an electronic apparatus including an extracting unit, a retrieving unit, a detecting unit, and a controlling unit. The extracting unit is configured to extract a first block at a first position of a first frame image from among a plurality of frame images constituting video data. The retrieving unit is configured to retrieve, from a retrieval region within a second frame image from among the plurality of frame images, a second block between which the first block has a smallest residual value, the second frame image and the first frame image having a first time length therebetween. The detecting unit is configured to detect a first motion vector between the first block and the second block. The controlling unit is configured to control the detecting unit so that detection of the first motion vector is regulated when the second block is retrieved at a third position apart from the second position of the second frame image corresponding to the first position by a first threshold or more.

As described above, according to the embodiments of the present invention, it is possible to prevent erroneous detection of the motion vectors.

These and other objects, features and advantages of the present invention will become more apparent in light of the following detailed description of best mode embodiments thereof, as illustrated in the accompanying drawings.

BRIEF DESCRIPTION OF DRAWINGS

FIGS. 2 are diagrams each showing a camera operational feature according to the embodiment of the present invention;

FIGS. 16 are diagrams showing a basis block setting method in the block-matching processing according to the embodiment of the present invention;

FIG. 20 shows an affine transformation model according to the embodiment of the present invention;

FIG. 21 illustrates multiple regression analyzing processing according to the embodiment of the present invention;

FIG. 27 is a table showing judgment results of video features according to the embodiment of the present invention;

DESCRIPTION OF PREFERRED
EMBODIMENTS

Hereinafter, embodiments of the present invention will be described with reference to the drawings.

Figure 1:
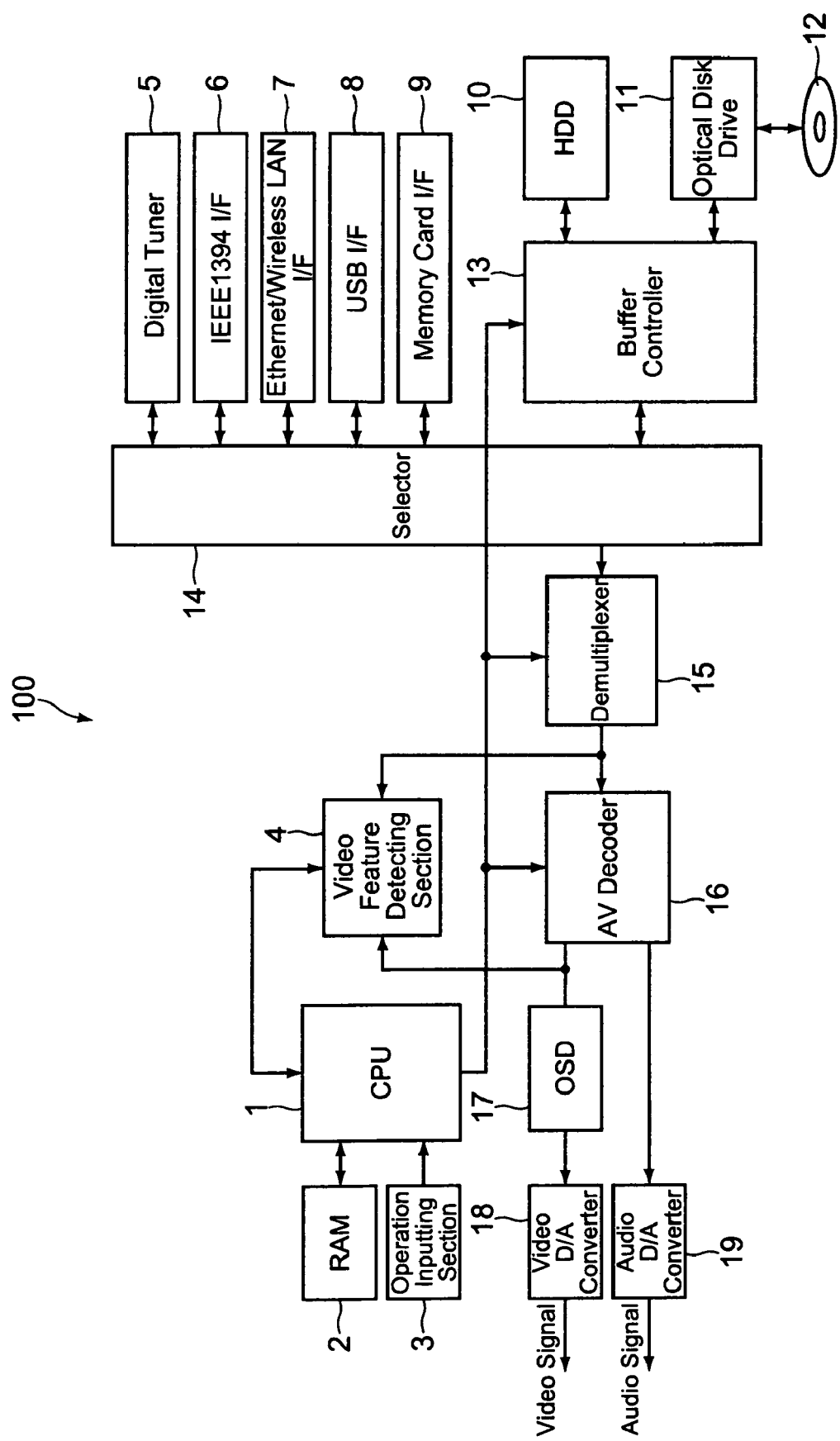
FIG. 1 is a diagram showing a structure of a recording/reproducing apparatus according to an embodiment of the present invention.

FIG. 1 is a diagram showing a structure of a recording/reproducing apparatus 100 according to an embodiment of the present invention.

As shown in the figure, the recording/reproducing apparatus 100 includes a CPU (Central Processing Unit) 1, a RAM (Random Access Memory) 2, an operation inputting section 3, a video feature detecting section 4, a digital tuner 5, an interface 6, an Ethernet (registered trademark)/wireless LAN (Local Area Network) interface 7, a USB (Universal Serial Bus) interface 8, a memory card interface 9, an HDD (Hard Disk Drive) 10, an optical disk drive 11, a buffer controller 13, a selector 14, a demultiplexer 15, an AV (Audio/Video) decoder 16, an OSD (On-Screen Display) 17, a video D/A (Digital/Analog) converter 18, and an audio D/A converter 19.

The CPU 1 arbitrarily accesses the RAM 2 or the like when necessary to control entire blocks of the recording/reproducing apparatus 100. The RAM 2 is used as a working area of the CPU 1 and the like, and temporarily stores an OS (Operating System), programs, processing data, and the like.

The operation inputting section 3 is composed of, for example, a button, a switch, a key, a touch panel, or a light receiving section for receiving infrared-ray signals transmitted from a remote controller (not shown), and inputs various setting values and instructions made by an operation of a user and outputs the values and instructions to the CPU 1.

Under control of the CPU 1, the digital tuner 5 receives a broadcast signal of a broadcast program in digital broadcast via an antenna (not shown) and tunes in and demodulates the broadcast signal of a specific channel. The broadcast signal is output to the demultiplexer 15 via the selector 14 to be reproduced, recorded onto the HDD 10 via the buffer controller 13, or recorded onto an optical disk 12 inserted into the optical disk drive 11.

The IEEE1394 interface 6 is connectable to an external device such as a digital video camera. For example, a video content shot and recorded by the digital video camera is reproduced or recorded onto the HDD 10 or the optical disk 12 as in the case of a video content of the broadcast program received by the digital tuner 5.

The Ethernet (registered trademark)/wireless LAN interface 7 is used to, for example, input a video content recorded by a PC or another recording/reproducing apparatus using the Ethernet (registered trademark) or a wireless LAN. The video content in this case is also capable of being reproduced or recorded onto the HDD 10 or the optical disk 12.

The USB interface 8 is used to input, via a USB, the video content from devices such as a digital camera and an external storage apparatus such as a so-called USB memory, for example. The video content in this case is also capable of being reproduced or recorded onto the HDD 10 or the optical disk 12.

The memory card interface 9 is connected to a memory card with a built-in flash memory, and is used to input the video content recorded in the memory card, for example. The video content in this case is also capable of being reproduced or recorded onto the HDD 10 or the optical disk 12.

The HDD 10 records various programs, data, and the like onto a built-in hard disk in addition to the various video contents received as broadcast signals or input from the external device, and reads out those programs, data, and the like from the hard disk at a time of reproduction thereof to output the data to the buffer controller 13.

The optical disk drive 11 records the video content and the like onto the optical disk 12, and reads out the video content and the like at the time of reproduction thereof to output the data to the buffer controller 13. The optical disk 12 is, for example, a DVD (Digital Versatile Disk), a BD (Blu-ray disk), and a CD (Compact Disk).

The buffer controller 13 controls write timings and data amounts of the video contents that are successively supplied from the digital tuner 5 or various other interfaces, with respect to the HDD 10 or the optical disk 12, and intermittently writes the video contents in the HDD 10 or the optical disk 12. Further, the buffer controller 13 controls read timings and data amounts of the video contents recorded onto the HDD 10 or the optical disk 12, and supplies the intermittently read-out video contents successively to the demultiplexer 15.

The selector 14 selects, based on a control signal from the CPU 1, the video content input from any of the digital tuner 5, the various interfaces, the HDD 10, and the optical disk drive 11.

The demultiplexer 15 separates the multiplexed video content input from the buffer controller 13 into a video signal and an audio signal, and outputs those signals to the AV decoder 16.

The AV decoder 16 decodes the encoded video signal and audio signal in, for example, an MPEG (Moving Picture Expert Group)-2 format or an MPEG-4 format, and outputs the video signal to the OSD 17 and the audio signal to the audio D/A converter 19.

The OSD 17 generates a graphic and the like to be displayed on a display (not shown) and subjects the generated graphic and the like to synthesizing processing or switching processing with the video signal. After that, the OSD 17 outputs the processed video signal to the video D/A converter 18. The video D/A converter 18 converts the video signal subjected to the graphic processing by the OSD 17 from a digital signal to an analog signal to obtain an NTSC (National Television Standards Committee) signal, and outputs the converted signal to the display (not shown) for display.

The audio D/A converter 19 converts an audio signal input from the AV decoder 16 from a digital signal to an analog signal, and outputs the converted signal to a speaker (not shown) for reproduction thereof.

The video feature detecting section 4 detects a video feature from a video signal before being decoded by the AV decoder 16 or that after being decoded by the AV decoder 16. FIGS. 2 and 3 are diagrams illustrating the video features.

FIG. 2A shows a video containing Scenes Si to S6 and shot while moving (panning) a camera in a left- or right-hand direction starting from Scene Si. FIG. 2B shows a video containing Scenes S1 to S6 and shot while the camera is zooming in starting from Scene S1. In this embodiment, the video feature caused by camera works such as pan, tilt (not shown), and zoom is referred to as camera operational feature.

Figures 3A, 3B:
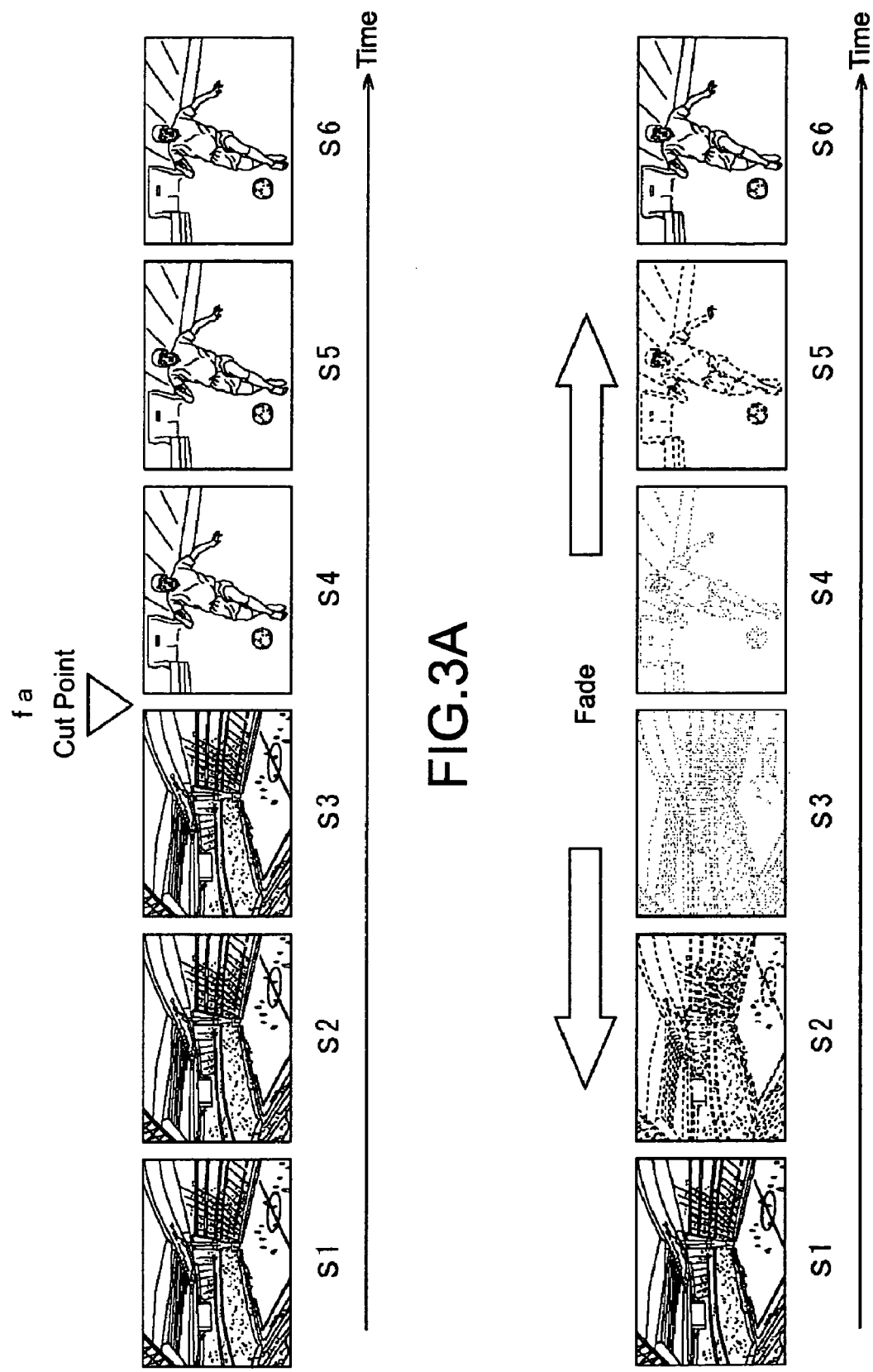
FIGS. 3 are diagrams each showing a video editorial feature according to the embodiment of the present invention.

FIG. 3A shows a state where a scene is switched from Scene S3 to Scene S4 at a cut point fa provided therebetween. FIG. 3B shows a state where a scene gradually fades out as represented sequentially by Scenes S1 to S3 and another scene gradually fades in as represented sequentially by Scenes S4 to S6. In this embodiment, a video feature caused while editing a video such as a video effect including cut and fade or a similarity (not shown) between scenes that is caused by coupling the scenes that have been shot at a plurality of places is referred to as video editorial feature.

The video feature detecting section 4 detects such a camera operational feature and video editorial feature by a common signal processing system to be described later, and uses the detected video features to carry out video content processing such as highlight scene generation and chapter generation.

FIGS. 4 are diagrams each schematically showing the camera operational feature.

Figure 4A:
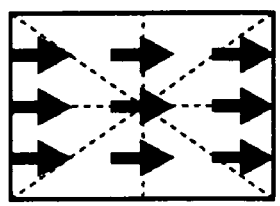
FIGS. 4 are diagrams each schematically showing the camera operational feature according to the embodiment of the present invention.

FIG. 4A shows a leftward pan. In this case, an object in the video moves in the right-hand direction.

Figure 4B:
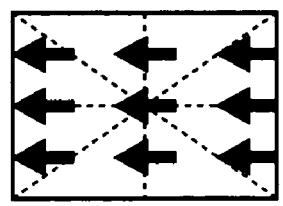

FIG. 4B shows a rightward pan. In this case, the object in the video moves in the left-hand direction.

Figure 4C:
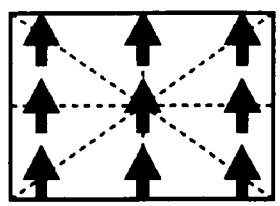

FIG. 4C shows a downward tilt. In this case, the object in the video moves upward.

Figure 4D:
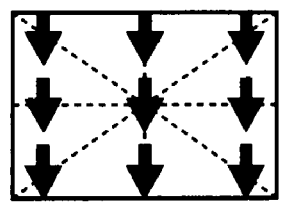

FIG. 4D shows an upward tilt. In this case, the object in the video moves downward.

Figure 4E:
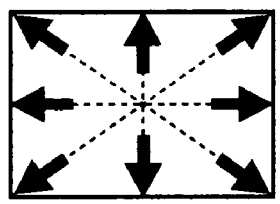

FIG. 4E shows zoom-in. In this case, the object in the video is enlarged.

Figure 4F:
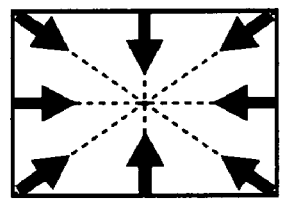

FIG. 4F shows zoom-out. In this case, the object in the video is shrunk.

Figure 5:
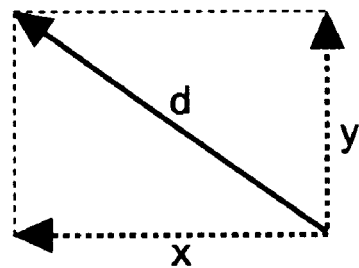
FIG. 5 is a diagram schematically showing change amounts of an image in zooming according to the embodiment of the present invention.

FIG. 5 is a diagram schematically showing change amounts of an image in zooming.

To detect the camera operational feature in the video content, it is necessary to detect a motion vector in the video content using block matching. However, as shown in FIGS. 4, because a movement amount of a zoomed image is smaller than that of a panned image or a tilted image, a detection level thereof is also considered to be small. Therefore, when carrying out the block matching using a single block as in the related art, the zoom may not be detected, thus causing erroneous detection. Thus, this embodiment carries out the block matching using a combination of a plurality of blocks.

Here, as indicated by an arrow d of FIG. 5, a change of the image in zooming is a change in a radial direction (oblique direction). Thus, when the change amount thereof is projected in x and Y directions, change amounts respectively indicated by arrows x and y are both smaller than the original change amount in the radial direction. Therefore, erroneous detection in the block matching is considered to be suppressed more in the block matching using a combination of a certain block and another block arranged in the radial direction than the block matching using a combination of the certain block and another block arranged in the X or Y direction. Accordingly, in this embodiment, the video feature detecting section 4 carries out the block matching using a combination of blocks arranged in the radial direction, specific processing of which will be described later.

Incidentally, recent home video cameras are often equipped with a so-called shake correcting function. However, a correction amount of the shake correcting function is limited, with the result that the video content shot by the home video camera is highly likely to more or less contain a shaking picture. Further, in actuality, the inventors of the present invention experimentally compared a video shot with the home video camera and a video shot in a studio, such as a broadcast program, and found that vibration amounts of motion vectors in both videos largely differ from each other.

Figure 6:
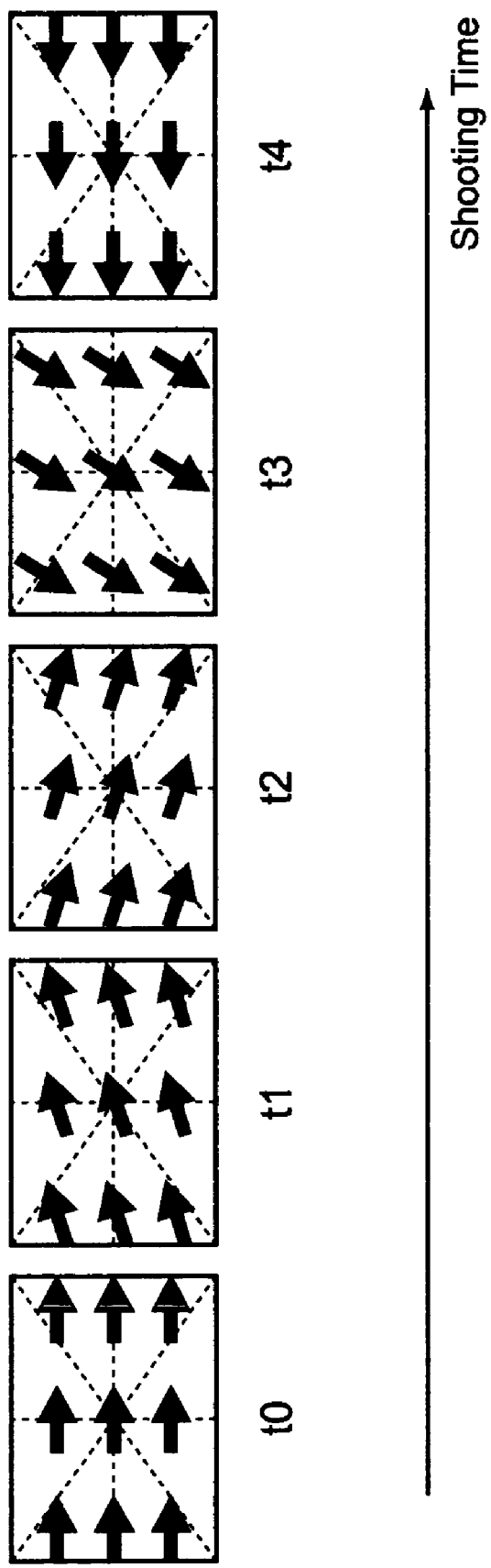
FIG. 6 is a diagram schematically showing a shaking picture caused by a hand movement according to the embodiment of the present invention.

FIG. 6 is a diagram schematically showing a shaking picture based on the experimental result. As shown in the figure, the shaking picture is randomly caused of pan and tilt in frame units. Therefore, a shake caused by a hand movement can be detected by detecting a time-series behavioral change of pan and tilt in a predetermined section within the video content, that is, a time-series behavioral change of motion vectors.

Thus, by detecting presence or absence of a shaking picture or an occurrence frequency thereof, it becomes possible to distinguish the video content recorded with a broadcast content from the video content shot with the home video camera. The recording/reproducing apparatus 100 is assumed to store therein a variety of multimedia contents, so distinguishing the video contents from one another is considered extremely effective in, for example, organizing the video contents. Thus, in this embodiment, the video feature detecting section 4 detects not only the pan, tilt, and zoom, but also the shake caused by a hand movement as the camera operational feature, specific processing of which will be described later.

Figure 7:
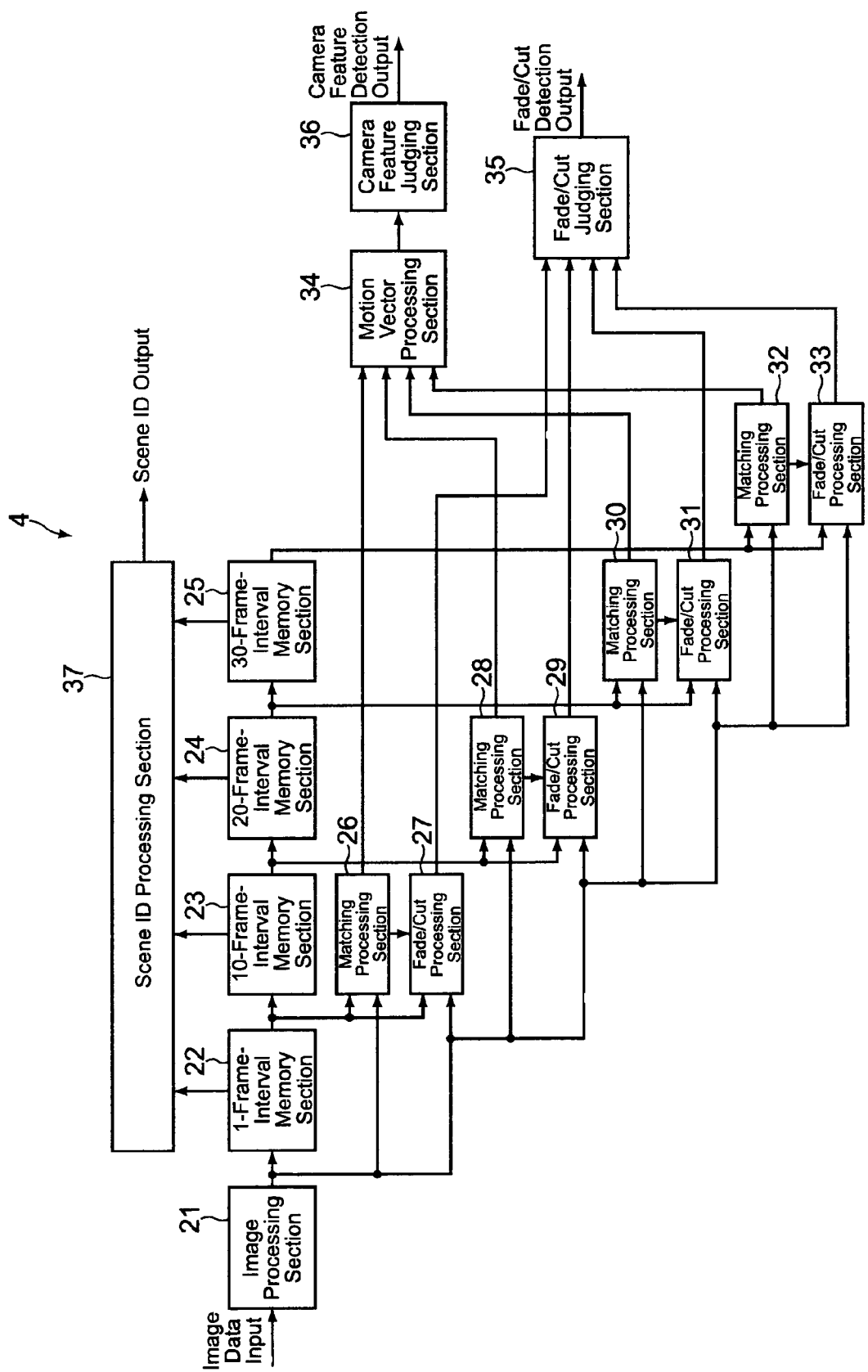
FIG. 7 is a diagram specifically showing a structure of a video feature detecting section according to the embodiment of the present invention.

FIG. 7 is a block diagram specifically showing a structure of the video feature detecting section 4.

As shown in the figure, the video feature detecting section 4 includes an image processing section 21, a 1-frame-interval memory section 22, a 10-frame-interval memory section 23, a 20-frame-interval memory section 24, a 30-frame-interval memory section 25, matching processing sections 26, 28, 30, and 32 for the respective memory sections, fade/cut processing sections 27, 29, 31, and 33 also provided for the respective memory sections, a motion vector processing section 34, a camera feature judging section 36, a fade/cut judging section 35, and a scene ID processing section 37.

The image processing section 21 inputs in the order of frame numbers image data (specifically, luminance signal Y and color-difference signals Cb and Cr) of frames in a baseband bandwidth that are contained in the video content decoded by the AV decoder 16, and carries out, based on the image data, various types of processing such as setting of a reference image region on which motion vector detection is to be performed and a position as a basis for the motion vector detection (hereinafter, referred to as basis position), setting of a retrieval region of the motion vector, and extraction of a block as a basis for the block-matching processing (hereinafter, referred to as basis block), detailed processing of which will be described later.

It should be noted that the reason for carrying out the processing in the baseband bandwidth is that regarding the video contents to be reproduced in the recording/reproducing apparatus 100, there may coexist video contents in various formats, such as digitally recorded DV (Digital Video) format data, analog-recorded VHS (Video Home System) format data, and 8-mm format data in addition to MPEG format data, so video feature extracting processing from those video contents is carried out in a common signal processing system as much as possible.

The 1-frame-interval memory section 22, the 10-frame-interval memory section 23, the 20-frame-interval memory section 24, and the 30-frame-interval memory section 25 store pieces of image data within a range from a frame from which the basis block has been extracted (hereinafter, referred to as basis frame) to respective frames between which the basis frame has intervals of 1 frame, 10 frames, 20 frames, and 30 frames. The frame intervals are of course not limited thereto.

The matching processing sections 26, 28, 30, and 32 carry out the block-matching processing between the basis frame input from the image processing section 21 and a retrieval region of frames respectively input from the inter-frame memory sections 22 to 25 (hereinafter, referred to as retrieval frames), and output respective results to the motion vector processing section 34. The block-matching processing involves retrieving, while moving a block within the retrieval frame (hereinafter, referred to as retrieval block) that has the same shape as the basis block of the basis frame, a position at which a similarity degree becomes maximum between the basis block and the retrieval block. The matching processing sections 26, 28, 30, and 32 respectively output motion vector amounts (i.e., movement amounts and movement directions in X (horizontal) and Y (vertical) directions) from the basis position to the respective retrieved positions to the motion vector processing section 34. Further, the matching processing sections 26, 28, 30, and 32 output residual values of Y, Cb, and Cr between the basis block and the respective retrieval blocks to the fade/cut processing sections 27, 29, 31, and 33, respectively. The processing above will be described later in detail.

Based on the post-matching differential values respectively input from the matching processing sections 26, 28, 30, and 32, the fade/cut processing sections 27, 29, 31, and 33 respectively generate fade/cut evaluation values and output the values to the fade/cut judging section 35, detailed processing of which will be described later.

It should be noted that the fade/cut processing sections 27, 29, 31, and 33 may individually calculate the differential values obtained between the basis block input from the image processing section 21 and the retrieval blocks respectively input from the inter-frame memory sections 22 to 25 and used in the block-matching processing.

Based on the motion vector amounts obtained as a result of the block-matching processing and respectively input from the matching processing sections 26, 28, 30, and 32, the motion vector processing section 34 estimates a motion vector amount at a position between which the basis position has a frame interval of 30 frames or more like 40 frames, and outputs the estimated motion vector amount to the camera feature judging section 36, detailed processing of which will be described later.

Based on the estimated motion vector amount input from the motion vector processing section 34, the camera feature judging section 36 judges the camera operational features of pan, tilt, and zoom within the video content by multiple regression analysis using an affine transformation model to be described later, and outputs the judgment result to the CPU 1, detailed processing of which will be described later.

Based on the fade/cut evaluation values respectively input from the fade/cut processing sections 27, 29, 31, and 33, the fade/cut judging section 35 judges the video editorial feature of fade or cut within the video content, and outputs the judgment result to the CPU 1.

Based on the image data of the retrieval frames respectively input from the inter-frame memory sections 22 to 25, the scene ID processing section 37 carries out predetermined inter-vector distance computing processing to judge the inter-frame similarity degrees, assigns the frames with respective scene IDs based on the judgment result, and outputs the results to the CPU 1, detailed processing of which will be described later.

Next, an operation of the recording/reproducing apparatus 100 thus structured will be described.

Figure 8:
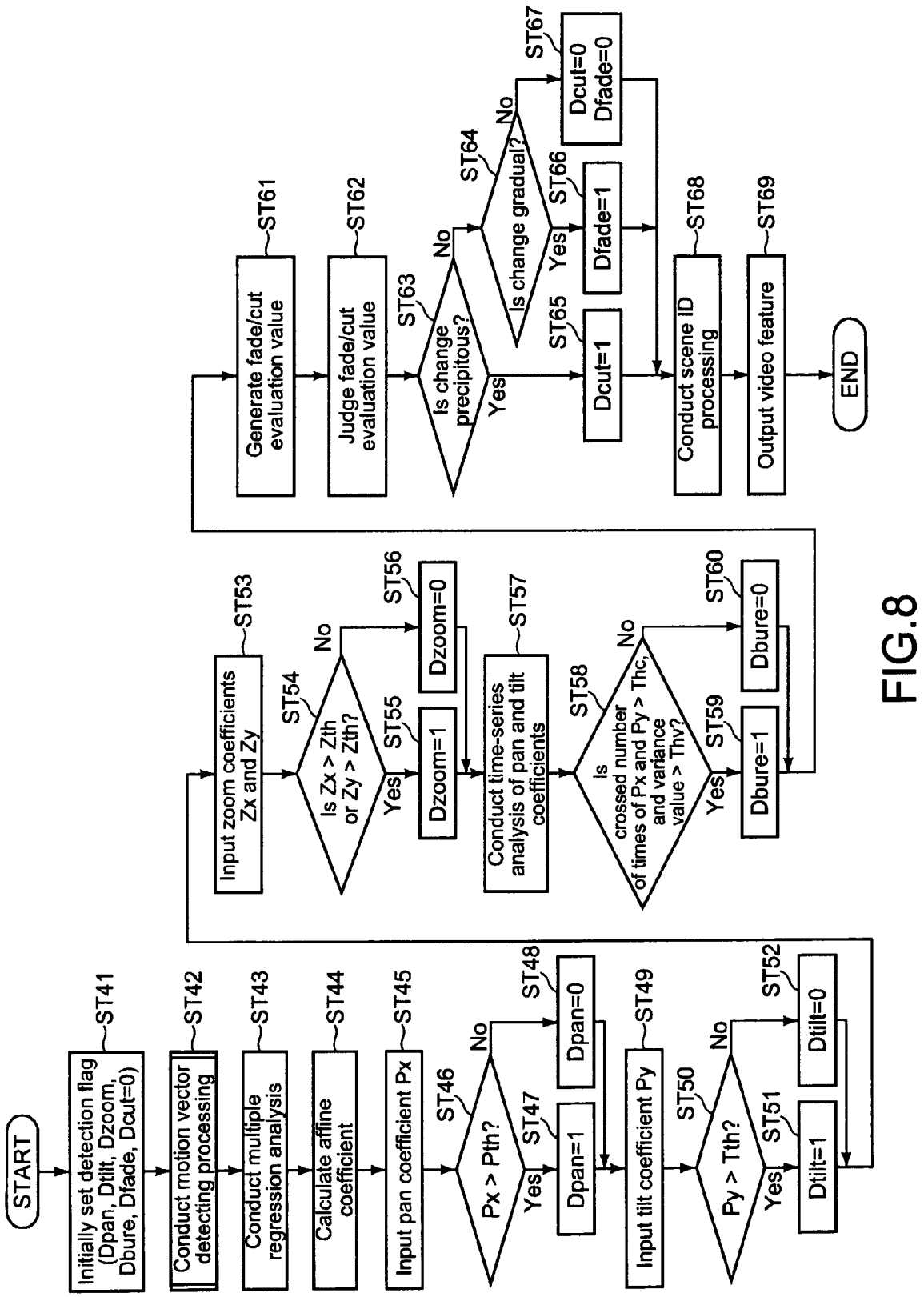
FIG. 8 is a flowchart showing a flow of processing that is carried out when a recording/reproducing apparatus judges a video feature according to the embodiment of the present invention.

FIG. 8 is a flowchart showing a flow of processing carried out when the recording/reproducing apparatus 100 detects video features.

As shown in the figure, the video feature detecting section 4 first performs initial settings of detection flags of the respective video features (Step 41). The detection flags respectively indicate that the camera operational features of pan, tilt, zoom, and shake and the video editorial features of fade and cut have been detected from the video content. The detection flags of the video features are respectively represented by Dpan, Dtilt, Dzoom, Dbure, Dfade, and Dcut, and flag values thereof are set to 0 in the initial settings.

Subsequently, the video feature detecting section 4 detects the motion vectors within the video content using the image processing section 21, the inter-frame memory sections 22 to 25, the matching processing sections 26, 28, 30, and 32, and the motion vector processing section 34 (Step 42).

Figure 9:
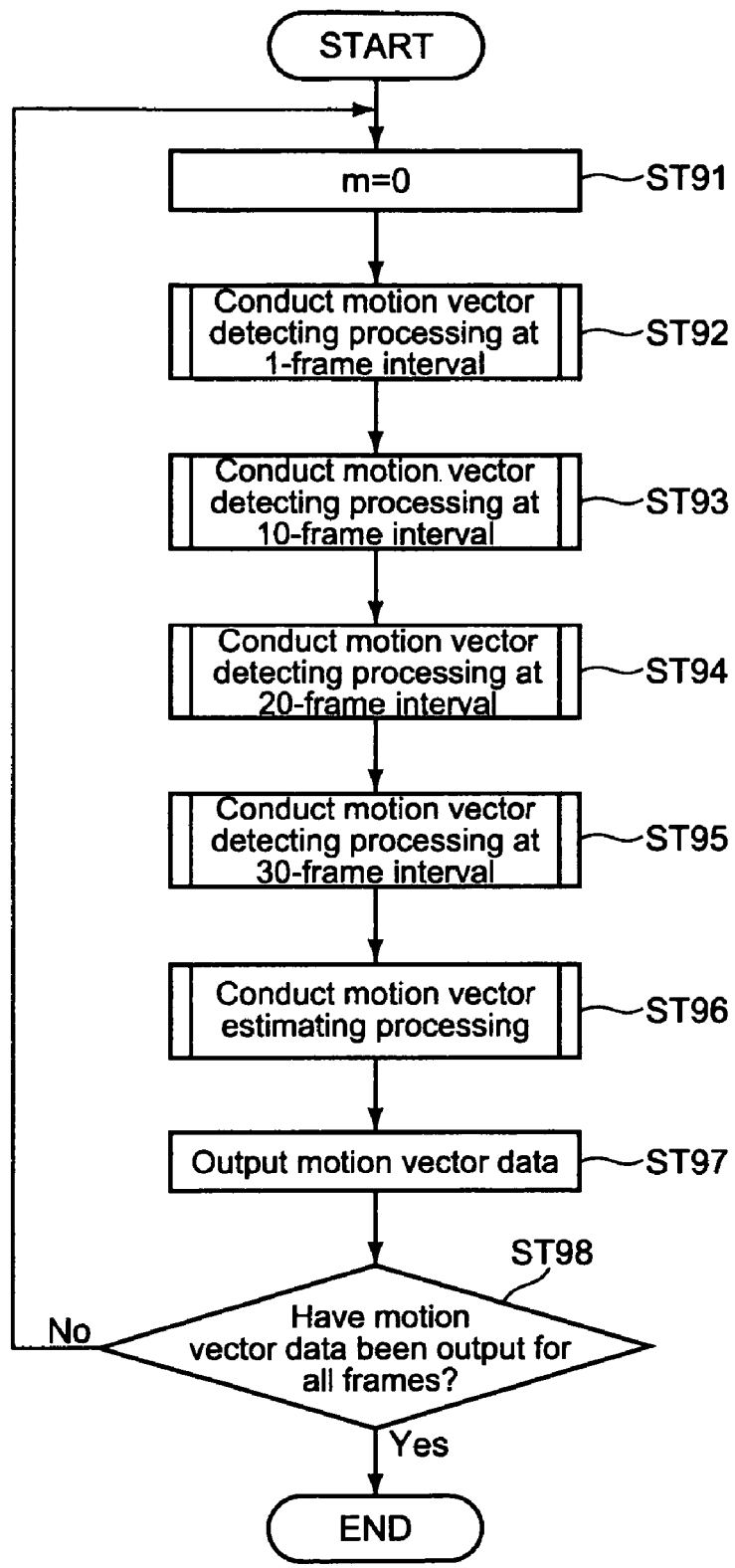
FIG. 9 is a flowchart showing a flow of motion vector detecting processing according to the embodiment of the present invention.

Now, descriptions will specifically be given on the motion vector detecting processing. FIG. 9 is a flowchart showing a flow of the motion vector detecting processing.

Incidentally, as described above, in the motion vector detecting processing, the motion vectors can be detected by setting a retrieval region in the retrieval frames between which the basis frame has respective predetermined frame intervals, and carrying out the block-matching processing between the basis frame and the respective retrieval regions. However, when the camera that has shot the video content is moved fast, for example, too long a frame interval probably leads to a frequent occurrence of motions in the video at that interval, thus degrading detection resolution performance and disabling accurate motion vector detection.

Further, when the camera is moved slowly, too short a frame interval causes an excessive decrease in detection value of the motion vector detected at that interval, thus disabling accurate motion vector detection also in this case.

In the above case where the camera is moved fast, the block corresponding to the basis block may move out of the retrieval region. However, it cannot be judged during the detection if the block corresponding to the basis block is still within the retrieval range or is outside the retrieval range.

Thus, in this embodiment, the video feature detecting section 4 estimates retrieval accuracy based on the movement amount at the detection points in the block matching and the residual values of the matching. When judged as inaccurate, the video feature detecting section 4 does not use the detection data thereof and uses only the accurate detection data, and estimates a motion vector amount at a longer frame interval based on the matching data at other frame intervals. Then, the video feature detecting section 4 uses the estimated motion vector amount as the motion vector amount to be used for detecting the video features.

As shown in FIG. 9, the video feature detecting section 4 first sets a counter value m indicating the number of accurate pieces of detection data to 0 (Step 91). The counter value m will be described later in detail.

Subsequently, the video feature detecting section 4 uses the basis frame input from the image processing section 21 and the retrieval frames respectively stored in the inter-frame memory sections 22 to 25 to carry out the motion vector detecting processing at the 1-frame interval, 10-frame interval, 20-frame interval, and 30-frame interval, respectively, (Steps 92 to 95) by the matching processing sections 26, 28, 30, and 32, detailed processing of which will be described later.

Next, based on the data of the motion vectors detected at the respective frame intervals, the video feature detecting section 4 uses the motion vector processing section 34 to estimate the motion vector at a 40-frame interval (Step 96), and outputs data on the estimated motion vector to the camera feature judging section 36 as final motion vector data (Step 97), detailed processing of which will be described later.

After that, the video feature detecting section 4 judges whether the motion vector data has been output for all the frames constituting a single video content, and repeats the processing of Steps 91 to 97 until the motion vectors are detected for all the frames (Step 98).

FIGS. 10 to 13 are flowcharts specifically showing processing of Steps 92 to 95, respectively, in FIG. 9 at the respective frame intervals in the motion vector detecting processing. First, descriptions will be given on the motion vector detecting processing at the 1-frame interval in Step 92.

Figure 10:
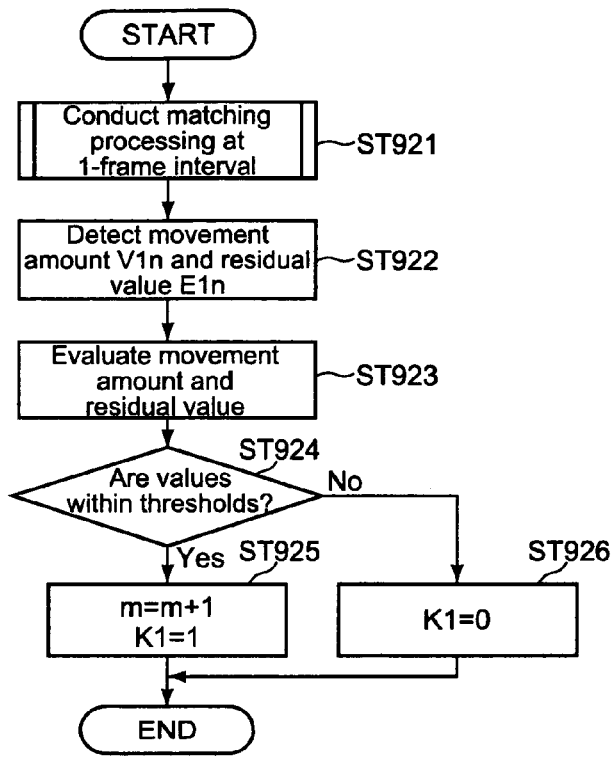
FIG. 10 is a flowchart specifically showing the motion vector detecting processing carried out at a 1-frame interval according to the embodiment of the present invention.

As shown in FIG. 10, first, the image processing section 21 and the matching processing section 26 carry out the block-matching processing between the basis frame and the retrieval frame between which the basis frame has the 1-frame interval (Step 921).

Figure 14:
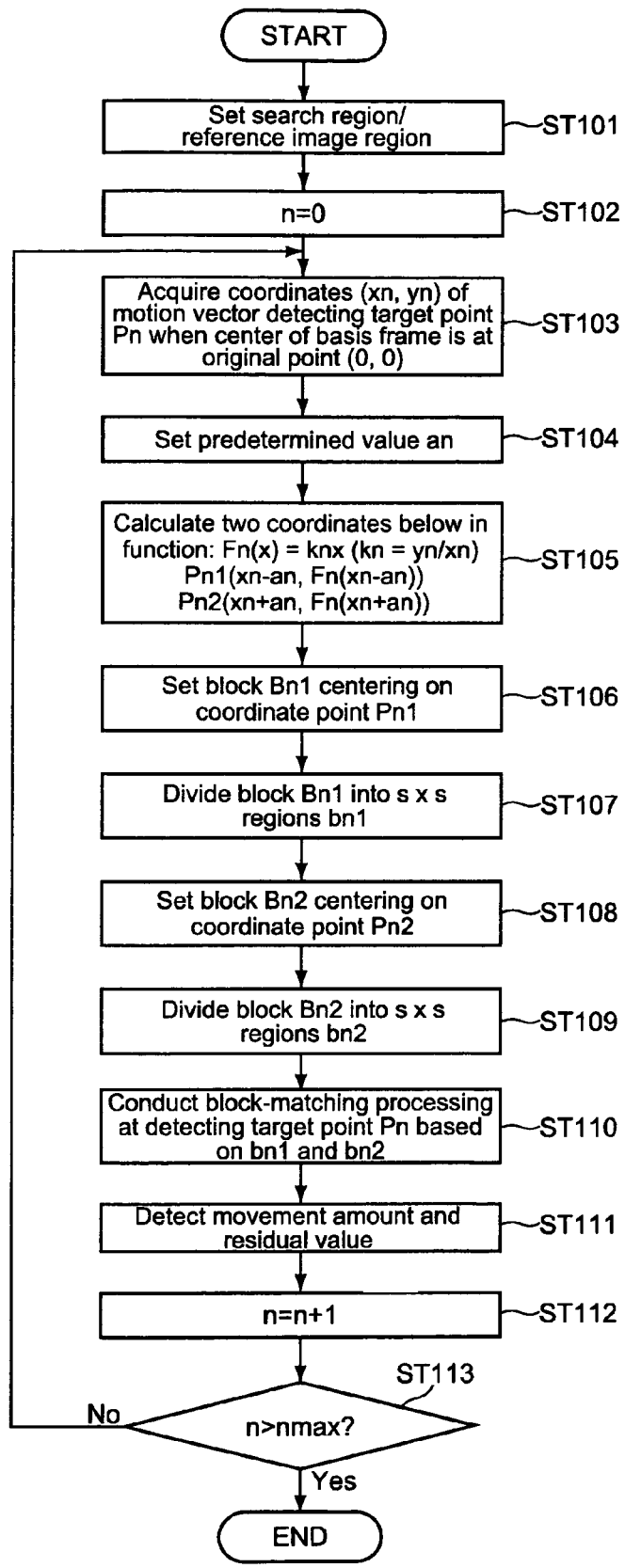
FIG. 14 is a flowchart showing a flow of block-matching processing according to the embodiment of the present invention.

Now, the block-matching processing will be described in detail. FIG. 14 is a flowchart showing a flow of the block-matching processing.

Figure 15:
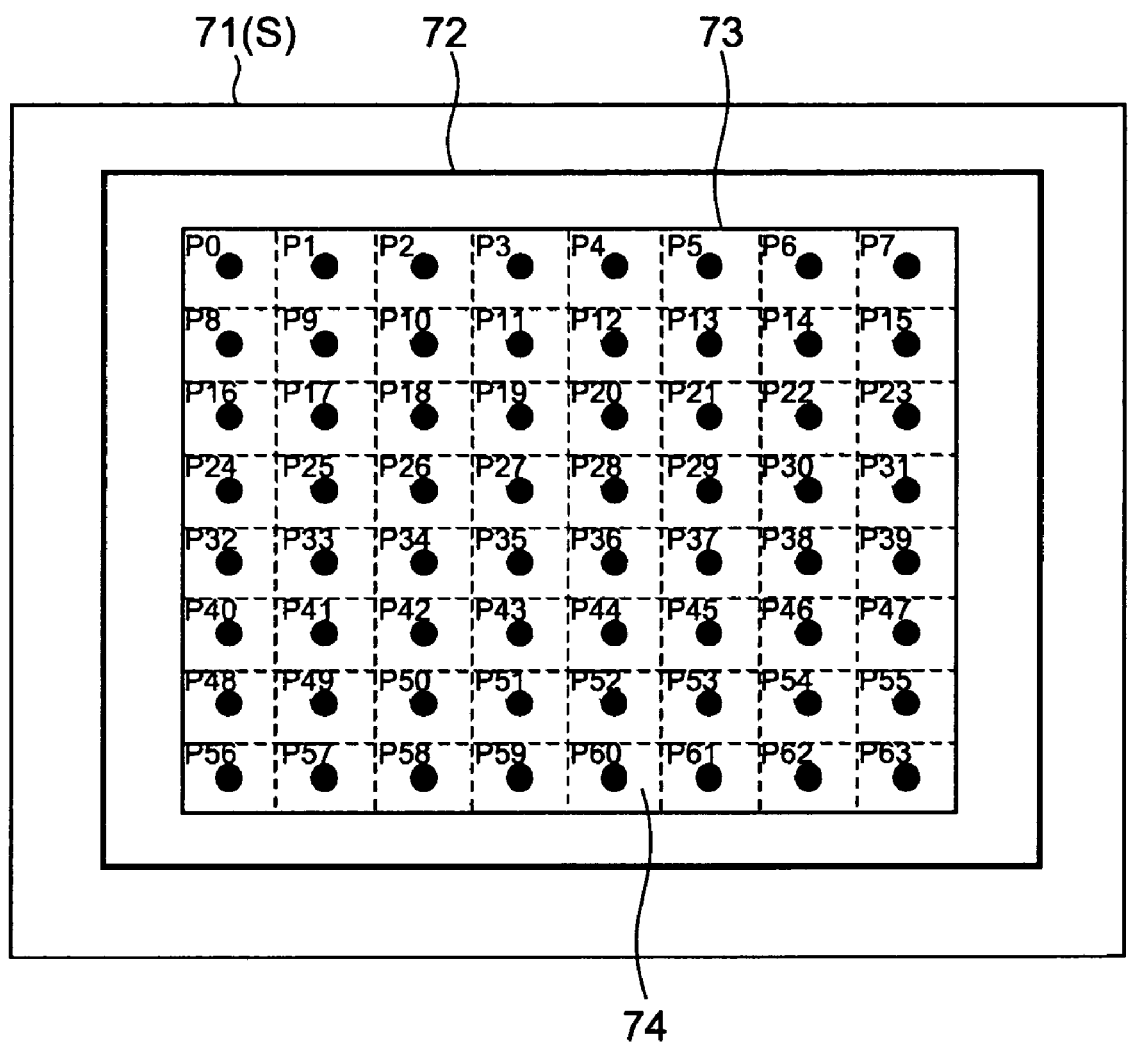
FIG. 15 is a diagram showing a state where a reference image region and a retrieval region are set according to the embodiment of the present invention.

As shown in the figure, the image processing section 21 first sets a reference image region and a retrieval region in the basis frame (Step 101). FIG. 15 is a diagram showing a state where the reference image region and the retrieval region are set.

As shown in the figure, the matching processing section 26 sets a retrieval region 72 that defines the retrieval range of the motion vector in a basis frame 71 as an original image (S), and sets a reference image region 73 inside the retrieval region 72 as a detecting target range of the motion vector.

Then, the matching processing section 26 divides the reference image region 73 into, for example, 8×8=64 regions 74, and sets a center point of each of the regions 74 as a motion vector detecting target point Pn (n=0 to 63).

It should be noted that a size of the basis frame 71 is, for example, 720×480 (pixels), but is not limited thereto. Moreover, the original image (S) may be a contracted image of the basis frame 71. For example, when the basis frame 71 has a size of 720×480 (pixels), an image having ¼ the size of the original image (S) (half the length in both longitudinal and lateral directions), that is, an image having a size of 360×240 (pixels) is set as the original image (S), and the retrieval region 72 and the reference image region 73 are set inside that image. Accordingly, loads on the matching processing sections 26, 28, 30, and 32 can be reduced without degrading precision in the later block-matching processing.

Referring back to FIG. 14, the image processing section 21 sets n of the motion vector detecting target point Pn to 0, and sets the basis block as a basis for the block-matching processing regarding P0 (Step 102). FIGS. 16 are diagrams showing a method of setting a basis block.

As shown in the figures, the image processing section 21 first acquires coordinates (xn, yn) of the detecting target point Pn (P0 in this case) with the center of the basis frame 71 as an original point O (0, 0) (Step 103). Subsequently, the image processing section 21 sets a predetermined value an (Step 104). The value an is ½ the length of one side of the basis frame set as follows, for example. The value of an is set to, for example, 4, but is not limited thereto.

Then, as shown in FIG. 16A, with a function being set to Fn(x)=knx (kn=yn/xn) on the basis frame 71, the image processing section 21 calculates the following two coordinates of the function using the set value an (Step 105).

Pn1(xn−an, Fn(xn−an))

Pn2(xn+an, Fn(xn+an))

Subsequently, the image processing section 21 sets a basis block Bn1 centering on the coordinate point Pn1 (Step 106), and divides the basis block Bn1 into s×s small blocks bn1 (Step 107).

After that, the image processing section 21 sets a basis block Bn2 centering on the coordinate point Pn2 (Step 108), and divides the basis block Bn2 into s×s small blocks bn2 (Step 109).

As shown in FIG. 16B, when s=4, each of the basis blocks Bn1 and Bn2 is composed of small blocks b0 to b15. In addition, as shown in FIG. 16C, each of the small blocks bn1 and bn2 corresponds to an average value of, for example, four pieces of pixel data.

Here, assuming that the four pieces of pixel data are dn1, dn2, dn3, and dn4, respectively, each of the small blocks bn1 and bn2 can be treated as 3-dimensional vector data of Y, Cb, and Cr. When data components thereof are assigned with suffixes of _y, _cb, and _cr, respectively, the data components of the small block bn1, for example, can respectively be expressed by the following expressions.

$$bn1\_y=(dn1\_y+dn2\_y+dn3\_y+dn4\_y)/4$$

$$bn1\_cb=(dn1\_cb+dn2\_cb+dn3\_cb+dn4\_cb)/4$$

$$bn1\_cr=(dn1\_cr+dn2\_cr+dn3\_cr+dn4\_cr)/4$$

Upon completing setting of the basis blocks Bn1 and Bn2 as described above, the block-matching processing at the 1-frame interval, 10-frame interval, 20-frame interval, and 30-frame interval is started by the matching processing sections 26, 28, 30, and 32, respectively. It should be noted that hereinafter, descriptions will only be given on the block-matching processing carried out by the matching processing section 26 at the 1-frame interval, but the processing thereof is the same as those carried out by the matching processing sections 28, 30, and 32 at the respective frame intervals.

Figure 17A:
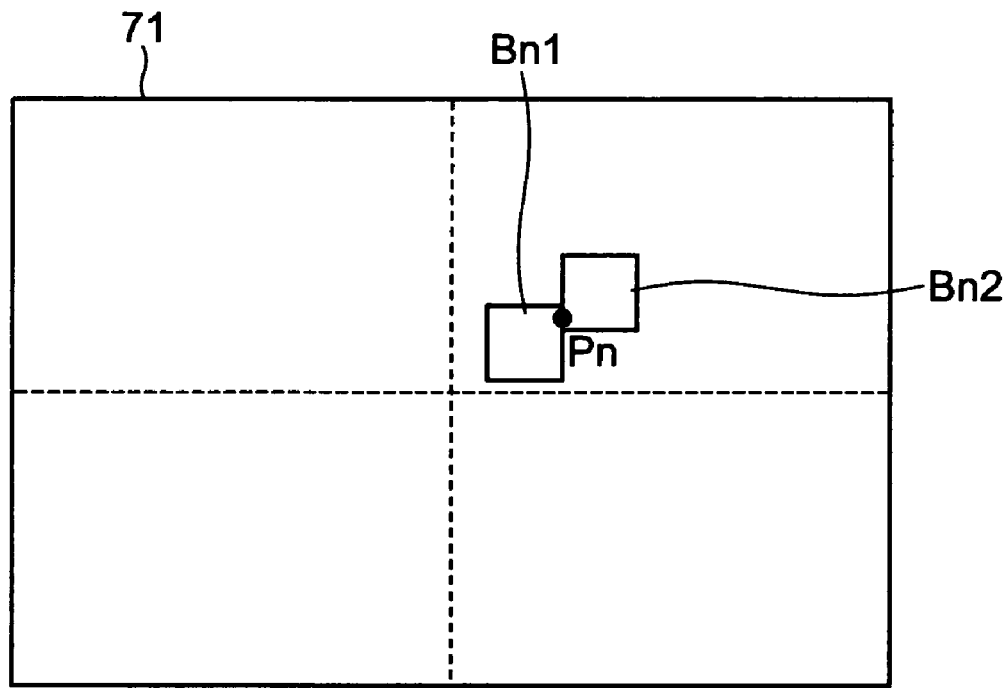
FIGS. 17 are diagrams showing states of the block-matching processing according to the embodiment of the present invention.
Figure 17B:
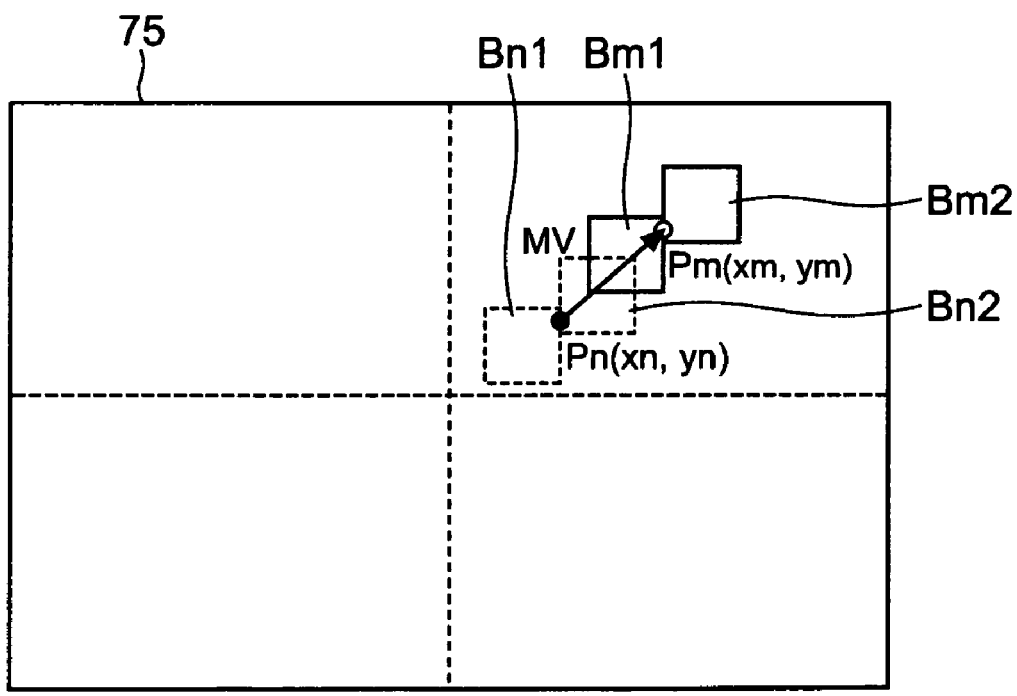

Based on the small blocks bn1 of the basis block Bn1 and the small blocks bn2 of the basis block Bn2, the matching processing section 26 carries out the block-matching processing (Step 110). FIGS. 17 are diagrams showing a state where the block-matching processing is carried out. FIG. 17A shows the basis blocks Bn1 and Bn2 (hereinafter, the two basis blocks will also be collectively referred to as basis blocks Bn) in the basis frame 71, and FIG. 17B shows retrieval blocks Bm1 and Bm2 (hereinafter, the two retrieval blocks will also be collectively referred to as retrieval blocks Bm) in a retrieval frame 75.

As shown in the figures, the matching processing section 26 extracts the two set basis blocks Bn from the basis frame 71, and carries out pattern matching to detect a position to which the blocks corresponding to the basis blocks Bn have moved in the retrieval frame 75 between which the basis frame 71 has a predetermined frame interval (1-frame interval in this case). Specifically, the matching processing section 26 extracts, from within the retrieval region 72 of the retrieval frame 75, a retrieval target block having the same shape and size as the basis blocks Bn, and detects, while moving the retrieval target block one pixel at a time, a position Pm of the retrieval blocks Bm at which vector distances of the respective data components of Y, Cb, and Cr of each of the small blocks bn of the basis blocks Bn become minimum. A movement amount Vn and movement direction of the retrieval target block from the coordinate point Pn of the basis frame 71 to the detection position Pm thereof become a motion vector MV. Moreover, the matching processing section 26 also calculates a post-matching residual value between the basis blocks Bn and the retrieval blocks Bm together with the movement amount.

Upon completing the motion vector detection regarding the detecting target point Pn, the matching processing section 26 increments n by 1 (Step 112), and repeats the above processing until n becomes nmax or more (Step 113). In this embodiment, nmax is 63.

By the processing described above, the basis blocks Bn1 and Bn2 are set in the radial direction from the center of the basis frame 71. In other words, the basis blocks Bn1 and Bn2 are set so as to respectively center on points located on a half line that starts from the center of the basis frame 71. By thus setting the blocks in the radial direction, precision in detecting the motion vector especially in zooming among other camera operational features can be dramatically improved as described above. Further, by using a combination of two blocks for the block-matching processing, precision in detecting not only the motion vector in zooming, but also the motion vector in the X and Y directions, that is, in panning and tilting, can be improved as compared to the case of using a single block for the block-matching processing as in the related art.

The matching processing sections 28, 30, and 32 carry out the motion vector detection in the same manner as the matching processing section 26 using the retrieval frames 75 between which the basis frame 71 has the 10-frame interval, 20-frame interval, and 30-frame interval, respectively.

Here, as described above, in this embodiment, when the detected motion vector is judged as inaccurate, the video feature detecting section 4 does not use the detection data thereof for improving precision in detecting the motion vector. Hereinafter, as detailed descriptions of the processing, processing of Step 922 and the subsequent steps will be described while referring back to FIG. 10.

As described above, in addition to setting the retrieval region 72 for retrieving the motion vector, the matching processing section 26 also sets another retrieval range for improving accuracy in detecting the motion vector. This retrieval range is, for example, ±8 pixels in both the X and Y directions from the detecting target point Pn. Moreover, the matching processing section 26 sets a predetermined threshold Eth to the post-matching residual value between the basis blocks Bn and the retrieval blocks Bm. Specifically, when judgment criteria are set such that the detection position Pm should be no more than 8 pixels away from the detecting target point Pn in a + or − direction and the post-matching residual value should be smaller than the predetermined threshold Eth, the matching processing section 26 does not use the detection data not satisfying the judgment criteria as being inaccurate data. The numerical value of the retrieval range is of course not limited to 8.

Here, movement amounts in the X (horizontal) and Y (vertical) directions in the motion vector detection at the 1-frame interval are respectively set as V1xn and V1yn, and the residual value is set as E1n.

As shown in FIG. 10, the matching processing section 26 detects the movement amounts V1xn and V1yn and the residual value E1n detected by the block-matching processing at the 1-frame interval (Step 922). Then, the matching processing section 26 judges, based on the judgment criteria, whether $|V1xn|<8,$ $|V1yn|<8,$ and $E1n<Eth$ are satisfied (Steps 923 and 924). When the values satisfy the judgment criteria, the matching processing section 26 sets an expedient weighting factor K1 to 1, and increments the counter value m indicating the number of accurate pieces of detection data by 1 (Step 925). On the other hand, when the values do not satisfy the judgment criteria, the matching processing section 26 sets K1 to 0 (Step 926). Then, the matching processing section 26 outputs, together with the detected movement amounts V1xn and V1yn and residual value E1n, the weighting factor K1 and the counter value m to the motion vector processing section 34.

Next, descriptions will be given on processing carried out after the block-matching processing in the motion vector detecting processing at the 10-frame interval. Here, the movement amounts in the X (horizontal) and Y (vertical) directions in the motion vector detection at the 10-frame interval are respectively set as V10xn and V10yn, and the residual value is set as E10n.

Figure 11:
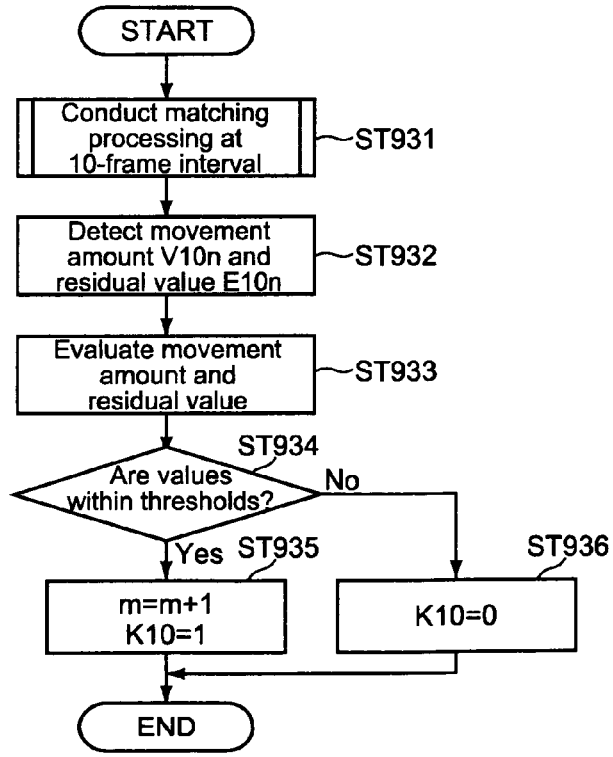
FIG. 11 is a flowchart specifically showing the motion vector detecting processing carried out at a 10-frame interval according to the embodiment of the present invention.

As shown in FIG. 11, the matching processing section 28 detects the movement amounts V10xn and V10yn and the residual value E10n detected by the block-matching processing at the 10-frame interval (Step 932). Then, the matching processing section 28 judges, based on the judgment criteria, whether $|V10xn|<8,$ $|V10yn|<8,$ and $E10n<Eth$ are satisfied (Steps 933 and 934). When the values satisfy the judgment criteria, the matching processing section 28 sets an expedient weighting factor K10 to 1, and increments the counter value m indicating the number of accurate pieces of detection data by 1 (Step 935). On the other hand, when the values do not satisfy the judgment criteria, the matching processing section 28 sets K10 to 0 (Step 936). Then, the matching processing section 28 outputs, together with the detected movement amounts V10xn and V10yn and residual value E10n, the weighting factor K10 and the counter value m to the motion vector processing section 34.

Next, descriptions will be given on processing carried out after the block-matching processing in the motion vector detecting processing at the 20-frame interval. Here, the movement amounts in the X (horizontal) and Y (vertical) directions in the motion vector detection at the 20-frame interval are respectively set as V20xn and V20yn, and the residual value is set as E20n.

Figure 12:
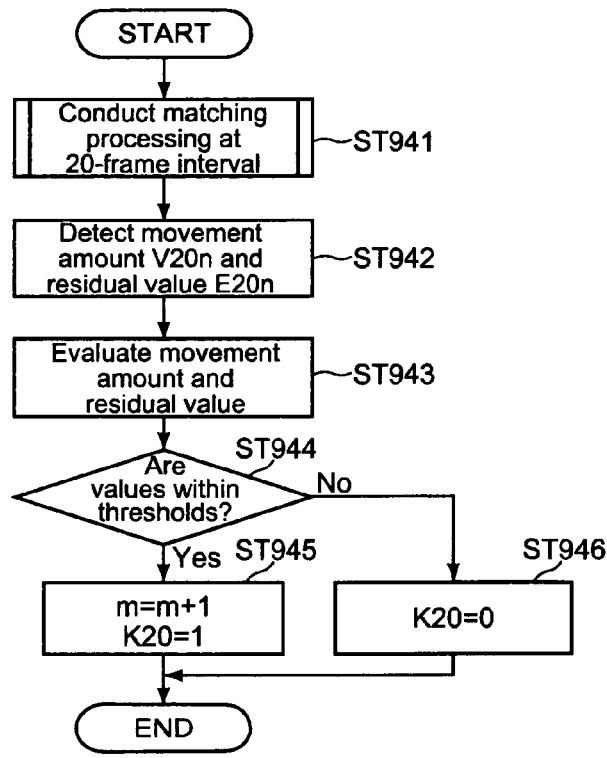
FIG. 12 is a flowchart specifically showing the motion vector detecting processing carried out at a 20-frame interval according to the embodiment of the present invention.

As shown in FIG. 12, the matching processing section 30 detects the movement amounts V20xn and V20yn and the residual value E20n detected by the block-matching processing at the 20-frame interval (Step 942). Then, the matching processing section 30 judges, based on the judgment criteria, whether $|V20xn|<8,$ $|V20yn|<8,$ and $E20n<Eth$ are satisfied (Steps 943 and 944). When the values satisfy the judgment criteria, the matching processing section 30 sets an expedient weighting factor K20 to 1, and increments the counter value m indicating the number of accurate pieces of detection data by 1 (Step 945). On the other hand, when the values do not satisfy the judgment criteria, the matching processing section 30 sets K20 to 0 (Step 946). Then, the matching processing section 30 outputs, together with the detected movement amounts V20xn and V20yn and residual value E20n, the weighting factor K20 and the counter value m to the motion vector processing section 34.

Next, descriptions will be given on processing carried out after the block-matching processing in the motion vector detecting processing at the 30-frame interval. Here, the movement amounts in the X (horizontal) and Y (vertical) directions in the motion vector detection at the 30-frame interval are respectively set as V30xn and V30yn, and the residual value is set as E30n.

Figure 13:
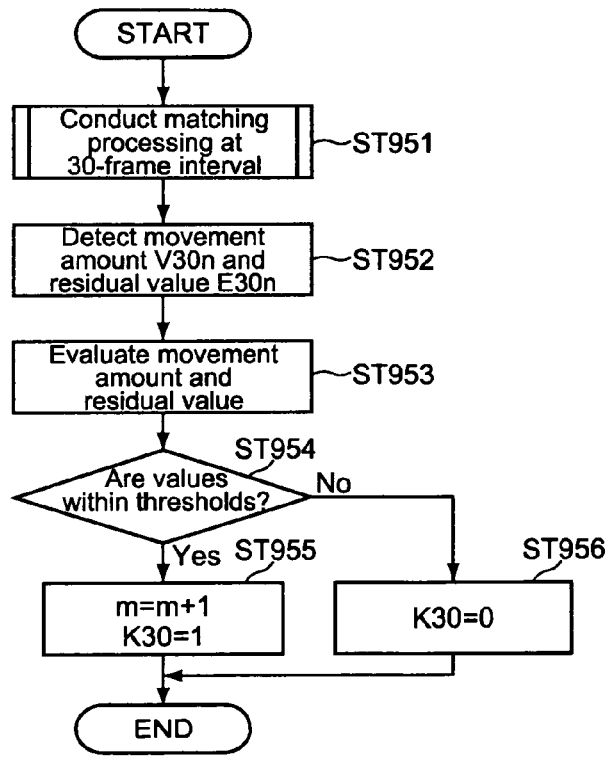
FIG. 13 is a flowchart specifically showing the motion vector detecting processing carried out at a 30-frame interval according to the embodiment of the present invention.

As shown in FIG. 13, the matching processing section 32 detects the movement amounts V30xn and V30yn and the residual value E30n detected by the block-matching processing at the 30-frame interval (Step 952). Then, the matching processing section 32 judges, based on the judgment criteria, whether $|V30xn|<8$, $|V30yn|<8$, and E30n<Eth are satisfied (Steps 953 and 954). When the values satisfy the judgment criteria, the matching processing section 32 sets an expedient weighting factor K30 to 1, and increments the counter value m indicating the number of accurate pieces of detection data by 1 (Step 955). On the other hand, when the values do not satisfy the judgment criteria, the matching processing section 32 sets K30 to 0 (Step 956). Then, the matching processing section 32 outputs, together with the detected movement amounts V30xn and V30yn and residual value E30n, the weighting factor K30 and the counter value m to the motion vector processing section 34.

Figure 18:
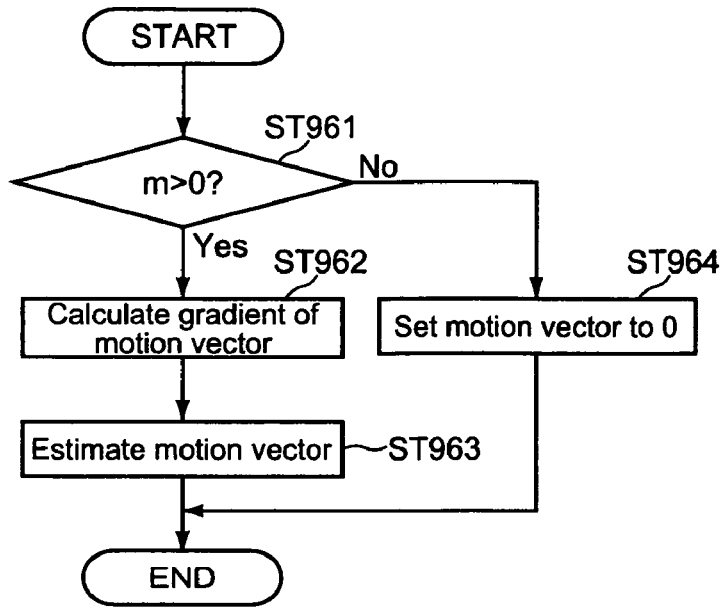
FIG. 18 is a flowchart showing a flow of motion vector estimating processing according to the embodiment of the present invention.
Figure 19:
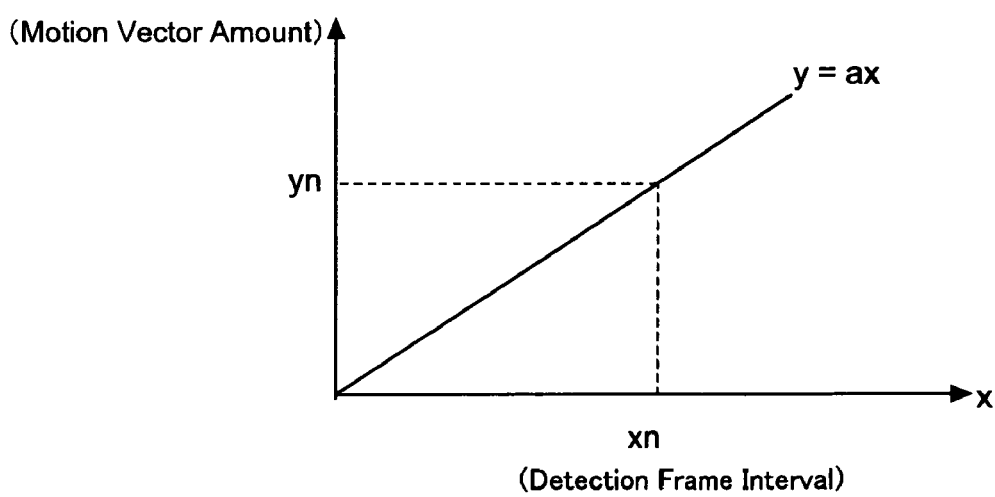
FIG. 19 is a diagram showing a gradient of a motion vector according to the embodiment of the present invention.

Next, descriptions will specifically be given on the motion vector estimating processing of Step 96 in FIG. 9 that is carried out by the motion vector processing section 34. FIG. 18 is a flowchart showing a flow of the motion vector estimating processing. Here, for estimating a motion vector at the 40-frame interval, an expedient gradient is calculated based on the respective detection frame intervals and movement amounts. FIG. 19 is a diagram showing the gradient.

As shown in FIG. 18, the motion vector processing section 34 first sums up the input counter values m respectively input from the matching processing sections 26, 28, 30, and 32, to judge whether the sum is equal to or larger than 1 (Step 961). When the sum of the counter values is equal to or larger than 1 (Yes), the motion vector processing section 34 calculates gradients of motion vectors at the respective frame intervals (Step 962).

Now, descriptions will first be given on a case where, based on an interval L1t (1-frame interval) and the movement amount V1xn, a gradient T1xn of the motion vector at the 1-frame interval is calculated.

The detection frame interval L1t is a ratio of a pts (Presentation Time Stamp) time interval p0 of the basis frame 71 to a pts time interval p1t of the retrieval frame 75 that is 1 frame after the basis frame 71. Thus, the detection frame interval L1t can be calculated using the following expression.

$L1t=p1t/p0$

This is because, since frame rates may differ from one another depending on video contents, the 1-frame-interval time is normalized when calculating the gradient.

Accordingly, the gradient regarding the movement amount in the X direction can be calculated using the following expression.

$T1xn=V1xn/L1t$

Moreover, the gradient regarding the movement amount in the Y direction can be calculated using the following expression.

$T1yn=V1yn/L1t$

Similarly, descriptions will be given on a case where, based on an interval L10t (10-frame interval) and the movement amount V10xn, a gradient T10xn of the motion vector at the 10-frame interval is calculated.

The detection frame interval L10t is a ratio of the pts time interval p0 of the basis frame 71 to a pts time interval p10t of the retrieval frame 75 that is 10 frames after the basis frame 71. Thus, the detection frame interval L10t can be calculated using the following expression.

$L10t=p10t/p0$

Accordingly, the gradient regarding the movement amount in the X direction can be calculated using the following expression.

$T10xn=V10xn/L10t$

Moreover, the gradient regarding the movement amount in the Y direction can be calculated using the following expression.

$T10yn=V10yn/L10t$

Similarly, descriptions will be given on a case where, based on an interval L20t (20-frame interval) and the movement amount V20xn, a gradient T20xn of the motion vector at the 20-frame interval is calculated.

The detection frame interval L20t is a ratio of the pts time interval p0 of the basis frame 71 to a pts time interval p20t of the retrieval frame 75 that is 20 frames after the basis frame 71. Thus, the detection frame interval L20t can be calculated using the following expression.

$L20t=p20t/p0$

Accordingly, the gradient regarding the movement amount in the X direction can be calculated using the following expression.

$T20xn=V20xn/L20t$

Moreover, the gradient regarding the movement amount in the Y direction can be calculated using the following expression.

$T20yn=V20yn/L20t$

Similarly, descriptions will be given on a case where, based on an interval L30t (30-frame interval) and the movement amount V30xn, a gradient T30xn of the motion vector at the 30-frame interval is calculated.

The detection frame interval L30t is a ratio of the pts time interval p0 of the basis frame 71 to a pts time interval p30t of the retrieval frame 75 that is 30 frames after the basis frame 71. Thus, the detection frame interval L30t can be calculated using the following expression.

$L30t=p30t/p0$

Accordingly, the gradient regarding the movement amount in the X direction can be calculated using the following expression.

$T30xn=V30xn/L30t$

Moreover, the gradient regarding the movement amount in the Y direction can be calculated using the following expression.

$T30yn=V30yn/L30t$

Thus, when a sum of the weighting factors (K1+K10+K20+K30) is larger than 0, average gradients Tavex(n) in the X direction and Tavey(n) in the Y direction can respectively be calculated using the following expressions.

$$Tavex(n)=(K1 \times T1xn+K10 \times T10xn+K20 \times T20xn+K30 \times T30xn)/(K1+K10+K20+K30)$$

$$Tavey(n)=(K1 \times T1yn+K10 \times T10yn+K20 \times T20yn+K30 \times T30yn)/(K1+K10+K20+K30)$$

Further, when (K1+K10+K20+K30) is 0, Tavex(n) and Tavey(n) can respectively be calculated using the following expressions.

$$Tavex(n)=0$$

$$Tavey(n)=0$$

Next, using the calculated average gradients, the motion vector processing section 34 estimates the motion vector at the 40-frame interval expediently (Step 963). Specifically, the motion vector processing section 34 can multiply the calculated average gradients by the frame interval to thus calculate the equivalent movement amount shown in FIG. 19. In other words, the estimated motion vector (estimated movement amount) at the 40-frame interval can be calculated for the X and Y directions using the following expressions.

$$40 \times Tavex(n)$$

$$40 \times Tavey(n)$$

It should be noted that in calculating the gradients, a straight line (y=ax) passing the original point as shown in FIG. 19 is expected in all the frame intervals. Thus, calculation values of the respective gradients are no more than approximate values.

The motion vector processing section 34 outputs the estimated motion vector to the camera feature judging section 36 as a motion vector obtained at the detecting target point Pn (Step 97 of FIG. 9). Furthermore, when the sum of the counter values m is 0 (No in Step 961), the motion vector processing section 34 sets the motion vector to 0 (Step 964) and outputs the value to the camera feature judging section 36 (Step 97 of FIG. 9). The output motion vector is used in the multiple regression analysis processing to be described later.

As described above, because the judgment criteria are set so that detection data not satisfying the criteria, that is, inaccurate detection data is not used in detecting the motion vector, precision in detecting the motion vector can be improved. In addition, by estimating the motion vector at the frame interval longer than other detection frame intervals based on the detection data of the motion vectors at the respective frame intervals, the range of the detection data (dynamic range) can be expanded, thus improving data resolution performance as compared to the case of merely scaling the detection data.

Referring back to FIG. 8, the video feature detecting section 4 carries out the multiple regression analysis processing by the camera feature judging section 36 based on the motion vector data output from the motion vector processing section 34 (Step 43), and calculates affine coefficients (Step 44). Now, descriptions will be given on the affine transformation model used for calculating the affine coefficients in the multiple regression analyzing processing.

FIG. 20 shows the affine transformation model. The affine transformation model is used for description of a parallel movement, enlargement/contraction, and rotation of a 3-dimensional object as coordinate transformation processing using a matrix. Because the camera operational features of pan, tilt, and zoom are considered as the parallel movement and enlargement/contraction of an object within the basis frame 71, the camera operational features can be described using the affine transformation model.

Here, when the frame interval is not large in the video content, the following approximating processing can be carried out assuming that a rotation angle θ is small regarding the rotational feature.

$$\sin \theta \approx \theta$$

$$\cos \theta \approx 1$$

Therefore, the affine transformation model can be transformed as shown in FIG. 20. In addition, the camera operational features can be detected by calculating the coefficients using the affine transformation model based on the detected motion vectors. Specifically, predetermined thresholds Pth, Tth, and Zth can respectively be set for pan, tilt, and zoom, and the affine coefficients processed from the detected motion vectors can be compared therewith, to thus detect the respective camera operational features.

FIG. 21 shows processing for calculating the affine coefficients by the multiple regression analysis. As shown in the figure, with explanatory variables as xy coordinates (xn, xy) at the detecting target point Pn in the basis frame 71 and explained variables (objective variables) as xy coordinates (xm, ym) at the motion vector detecting position Pm in the retrieval frame 75, the camera feature judging section 36 calculates coefficients Px, Py, and Zx of pan, tilt, and zoom, respectively, by carrying out the multiple regression analyzing processing (Step 44).

Referring back to FIG. 8, the camera feature judging section 36 inputs, from among the calculated affine coefficients, a pan coefficient Px (Step 45). Then, the camera feature judging section 36 judges whether Px is larger than the threshold Pth (Step 46). When Px is larger than Pth (Yes), the camera feature judging section 36 sets a pan detection flag Dpan to 1 (Step 47), and when equal to or smaller than Pth (No), sets the pan detection flag Dpan to 0 (Step 48).

Subsequently, the camera feature judging section 36 inputs, from among the calculated affine coefficients, a tilt coefficient Py (Step 49). Then, the camera feature judging section 36 judges whether Py is larger than the threshold Tth (Step 50). When Py is larger than Tth (Yes), the camera feature judging section 36 sets a tilt detection flag Dtilt to 1 (Step 51), and when equal to or smaller than Tth (No), sets the tilt detection flag Dtilt to 0 (Step 52).

Next, the camera feature judging section 36 inputs, from among the calculated affine coefficients, zoom coefficients Zx and Zy (Step 53). Then, the camera feature judging section 36 judges whether Zx or Zy is larger than the threshold Zth (Step 54). When at least one of Zx and Zy is larger than Zth (Yes), the camera feature judging section 36 sets a zoom detection flag Dzoom to 1 (Step 55), and when equal to or smaller than Zth (No), sets the zoom detection flag Dzoom to 0 (Step 56).

It should be noted that regarding the camera operational features of pan, tilt, and zoom, the camera feature judging section 36 may distinguishably detect each of leftward pan/rightward pan, leftward tilt/rightward tilt, and zoom in/zoom out. The distinction can easily be made by referring to signs of positive and negative of the respective affine coefficients.

Figure 22:
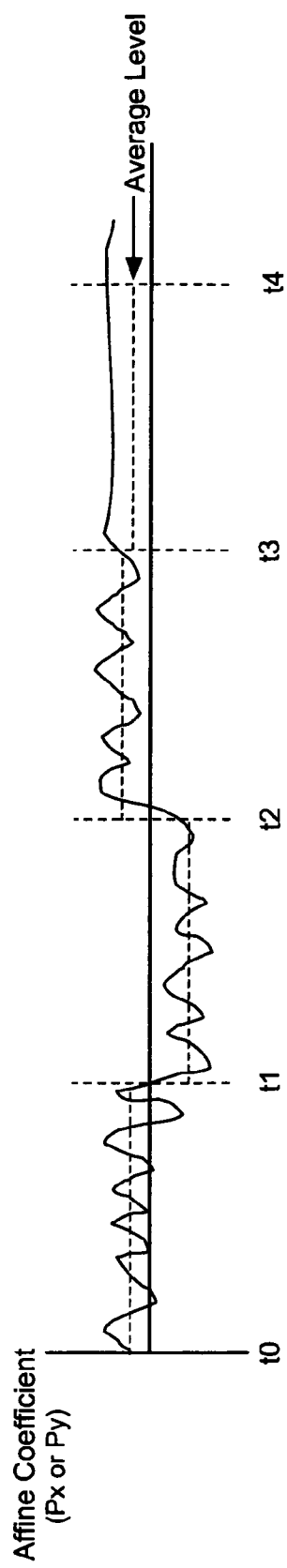
FIG. 22 is a diagram showing shake judging processing according to the embodiment of the present invention.

Subsequently, the camera feature judging section 36 carries out time-series analysis on the pan coefficient Px and the tilt coefficient Py to judge on shake caused by a hand movement (Step 57). FIG. 22 is a diagram showing the shake judging processing.

As shown in FIG. 22, the camera feature judging section 36 is capable of judging shake caused by a hand movement based on variances of the pan coefficient Px and the tilt coefficient Py that have been calculated from the affine coefficients for each of the predetermined sections (t0 to t1, t1 to t2, t2 to t3, and t3 to t4) within the video content, and the number of times Px or Py crosses an average value level in each of the predetermined sections. Each of the predetermined sections is set to a time length of, for example, about 0.5 sec to 5 sec.

For example, in the section t0 to t1 in the figure, Px or Py crosses the average value level 12 times. The camera feature judging section 36 judges whether the crossed number of times exceeds a threshold Thcr and a variance value of Px or Py in each of the predetermined sections is larger than a predetermined threshold Thv (Step 58).

Here, when the number of pieces of data of Px and Py for each of the predetermined sections is represented by N, the pieces of data are respectively represented by Px(n) and Px(y), and average values of those pieces of data are respectively represented by Pxave and Pyave, variance values Pxvari and Pyvari of Px and Py, respectively, can be calculated using the following expressions.

$$Pxvari=(1/N)\Sigma((Pxave-Px(n))\times(Pxave-Px(n)))$$

$$Pyvari=(1/N)\Sigma((Pyave-Py(n))\times(Pyave-Py(n)))$$

When either of the crossed number of times and the variance values are larger than the respective thresholds (Yes), the camera feature judging section 36 judges that a picture of the predetermined section is a shaking picture and sets a shake detection flag Dbure to 1 (Step 59). When at least one of the crossed number of times and the variance values is/are equal to or smaller than the corresponding threshold (No), the camera feature judging section 36 sets the shake detection flag Dbure to 0 (Step 60).

Next, the video feature detecting section 4 carries out fade and cut detecting processing.

First, descriptions will be given on processing carried out by the fade/cut processing sections 27, 29, 31, and 33.

The fade/cut processing sections 27, 29, 31, and 33 respectively input post-matching residual values E1n, E10n, E20n, and E30n from the matching processing sections 26, 28, 30, and 32, respectively, and output to the fade/cut judging section 35 fade/cut evaluation values generated based on those residual values (Step 61).

Here, when the residual values are each represented by En (n=0 to 63), a fade/cut evaluation value H can be calculated using the following expression.

$$H = \sum_{n=0}^{63} En$$

Therefore, the fade/cut processing sections 27, 29, 31, and 33 respectively input the residual values E1n, E10n, E20n, and E30n from the matching processing sections 26, 28, 30, and 32, respectively, until n reaches 63, that is, until residual values for all the detecting target points P0 to P63 of the basis frame 71 are input, and respectively calculate sums thereof.

Figure 23:
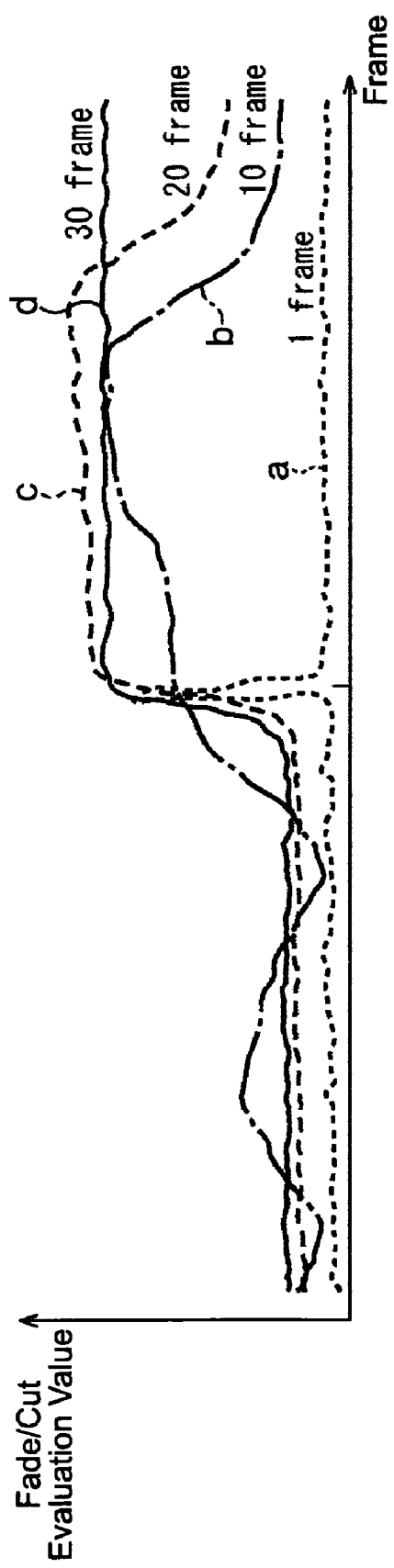
FIG. 23 is a graph showing a relationship between calculation results of a fade/cut evaluation value and elapse of frames regarding a case where a cut point is included according to the embodiment of the present invention.
Figure 24:
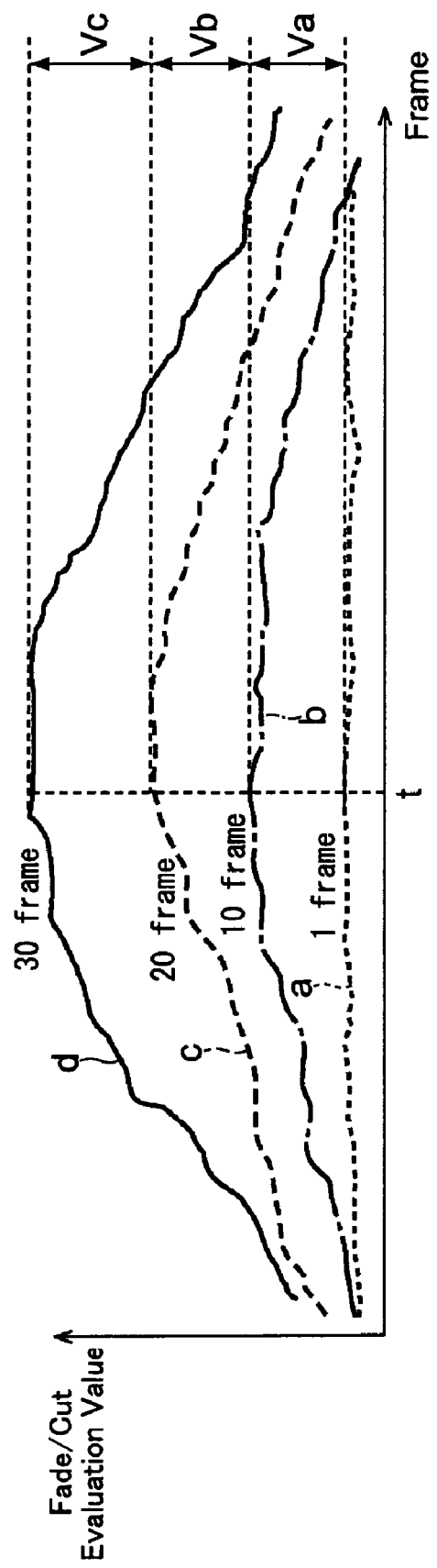
FIG. 24 is a graph showing a relationship between calculation results of the fade/cut evaluation value and elapse of frames regarding a case where fade is included according to the embodiment of the present invention.

FIGS. 23 and 24 are each a graph showing a relationship between calculation results of the fade/cut evaluation values and elapse of a frame, for each frame interval. FIG. 23 is a graph of a case where a cut point is contained, and FIG. 24 is a graph of a case where fade is contained.

Based on the fade/cut evaluation values shown in FIGS. 23 and 24, the fade/cut judging section 35 carries out fade/cut judgment (Step 62). Specifically, when a change in fade/cut evaluation value accompanying the elapse of a frame is precipitous (Yes in Step 63), the fade/cut judging section 35 judges the change as a cut and sets a cut detection flag Dcut to 1 (Step 65). On the other hand, when the change in fade/cut evaluation value accompanying the elapse of a frame is gradual (Yes in Step 64), the fade/cut judging section 35 judges the change as fade and sets a fade detection flag Dfade to 1 (Step 66). When neither can be detected (No in Step 64), the fade/cut judging section 35 sets the cut detection flag Dcut and the fade detection flag Dfade to 0 (Step 67).

Specifically, the fade/cut judging section 35 analyzes the change in fade/cut evaluation value at the 1-frame interval, and when a peak characteristic as that shown in Graph a of FIG. 23 is detected, judges a peak point thereof as a cut point.

Further, when no peak characteristic is detected, as shown in FIG. 24, the fade/cut judging section 35 calculates, at a predetermined time t, a differential Va obtained between a fade evaluation value at the 1-frame interval (Graph a) and a fade evaluation value at the 10-frame interval (Graph b), a differential Vb obtained between the fade evaluation value at the 10-frame interval and a fade evaluation value at the 20-frame interval (Graph c), and a differential Vc obtained between the fade evaluation value at the 20-frame interval and a fade evaluation value at the 30-frame interval (Graph d).

In the case of fade as shown in FIG. 24, because the video gradually changes, change amounts of the fade/cut evaluation values are differed from one another depending on the frame intervals thereof. Thus, all values of Va, Vb, and Vc are notably expressed as positive numerical values relatively close to one another. On the other hand, in the case of cut as shown in FIG. 23, Va, Vb, and Vc may all be negative values largely differed from one another. Therefore, the fade/cut judging section 35 can detect the fade by analyzing Va, Vb, and Vc.

It should be noted that instead of inputting the post-matching residual values from the matching processing sections 26, 28, 30, and 32, respectively, as described above, the fade/cut processing sections 27, 29, 31, and 33 may individually calculate the fade/cut evaluation values using the basis block Bn input from the image processing section 21 and the retrieval blocks Bm respectively input from the inter-frame memory sections 22 to 25 and used in the block-matching processing. Specifically, the fade/cut processing sections 27, 29, 31, and 33 detect, for each detecting target point Pn, a differential between the basis block Bn and the retrieval block Bm for each piece of data on Y, Cb, and Cr, and respectively calculate a sum of the differentials for the detecting target points P0 to P63 as the fade/cut evaluation value. The differential in this case is calculated by comparing combined data of the basis blocks Bn1 and Bn2 and combined data of the retrieval blocks Bm1 and Bm2.

Further, instead of using the retrieval block Bm retrieved (displaced) in the block-matching processing, the fade/cut processing sections 27, 29, 31, and 33 may calculate, for each detecting target point Pn, a differential between the basis block Bn and the retrieval target block arranged at the same position as the basis blocks Bn in the retrieval frame. However, using the post-matching residual values as described above naturally requires smaller load on the fade/cut processing sections 27, 29, 31, and 33.

Figure 25:
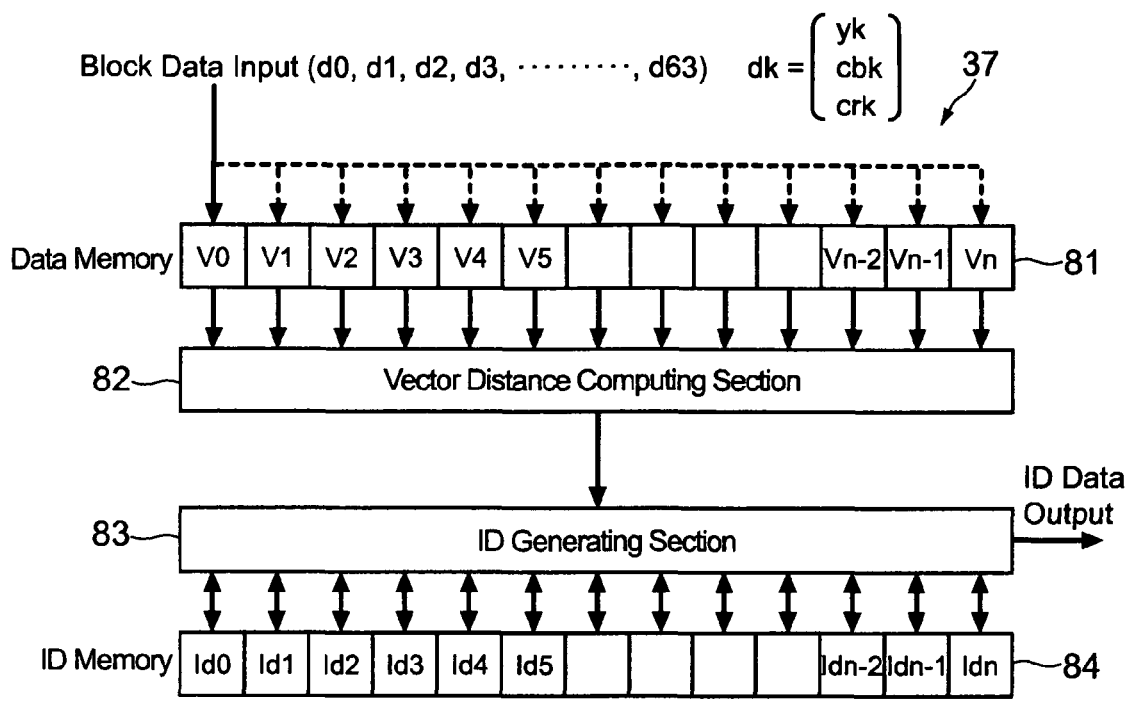
FIG. 25 is a diagram showing a structure of a scene ID processing section according to the embodiment of the present invention.

Next, the video feature detecting section 4 carries out scene ID processing (Step 68), detailed processing of which will be described hereinbelow. FIG. 25 is a diagram showing a structure of the scene ID processing section 37.

As shown in the figure, the scene ID processing section 37 includes a data memory 81, a vector distance computing section 82, an ID generating section 83, and an ID memory 84.

The data memory 81 sequentially inputs, from the respective inter-frame memory sections 22 to 25, as multi-dimensional vector data (d0 to d63), data on the basis blocks Bn of the basis frames 71 and data on the retrieval blocks Bm of the retrieval frames 75 used in the block-matching processing. Block data dk of a block number k is composed of data components of Y, Cb, and Cr of the block number k.

The data memory 81 is structured as a ring buffer, for example. The data memory 81 stores pieces of input block data dk to storing regions V0 to Vn every time 1 frame elapses, for example. Here, n is, for example, 16, but is not limited thereto.

The vector distance computing section 82 sequentially carries out vector distance computing processing between input block data of a single frame and the pieces of block data of other frames stored in the storage regions V0 to Vn, respectively, and judges the block data with minimum vector distance. In other words, the vector distance computing section 82 judges a similarity degree of the frames based on the block data, and determines a frame similar to the one frame.

Based on the result of computing the vector distance, the ID generating section 83 generates a scene ID for the pieces of block data respectively stored in the storage regions V0 to Vn. The ID memory 84 sequentially stores the generated scene IDs in the storage regions Id0 to Idn, respectively.

The storage regions V0 to Vn of the data memory 81 and the storage regions Id0 to Idn of the ID memory 84 respectively correspond to each other. For example, in the figure, when the vector distance computing section 82 judges that the input block data is similar to the block data stored in the storage region V5, an ID same as that stored in the storage region Id5 is generated, and the generated ID is assigned to the input block data. The input block data is stored in the storage region V0 of the data memory 81, and the generated ID is stored in the storage region Id0 of the ID memory 84. At this time, the block data that has been stored in the storage region V0 before generation of the ID is moved to the storage region V1, and the block data that has been stored in the storage region V1 is moved to the storage region V2. In addition, the ID that has been stored in the storage region Id0 of the ID memory 84 before generation of the ID is moved to the storage region Id1, and the ID that has been stored in the storage region Id1 is moved to the storage region Id2. As described above, pieces of data stored in the respective storage regions of the data memory 81 and the ID memory 84 are shifted every time an ID is generated. The ID generating section 83 sequentially outputs the generated IDs to the CPU 1.

When judged that the block data has no similarity with the block data stored in any of the storage regions of the data memory 81 by the vector distance computing processing, a new ID is assigned thereto. Further, when all the storage regions of the data memory 81 and the ID memory 84 become full, the stored pieces of data are deleted sequentially starting from oldest data.

It should be noted that the data memory 81 and the ID memory 84 may be provided as physically-separate memory devices, or may be provided as a single memory device divided for use as the respective memories.

Moreover, instead of carrying out the processing at the 1-frame interval, the ID processing may be carried out at the 10-frame interval, 20-frame interval, and 30-frame interval using block data of the 10-frame-interval memory section 23, the 20-frame-interval memory section 24, and the 30-frame-interval memory section 25, respectively. Accordingly, it is possible to save storage capacities of the data memory 81 and the ID memory 84, and reduce loads on the vector distance computing section 82 and the ID generating section 83.

Figure 26:
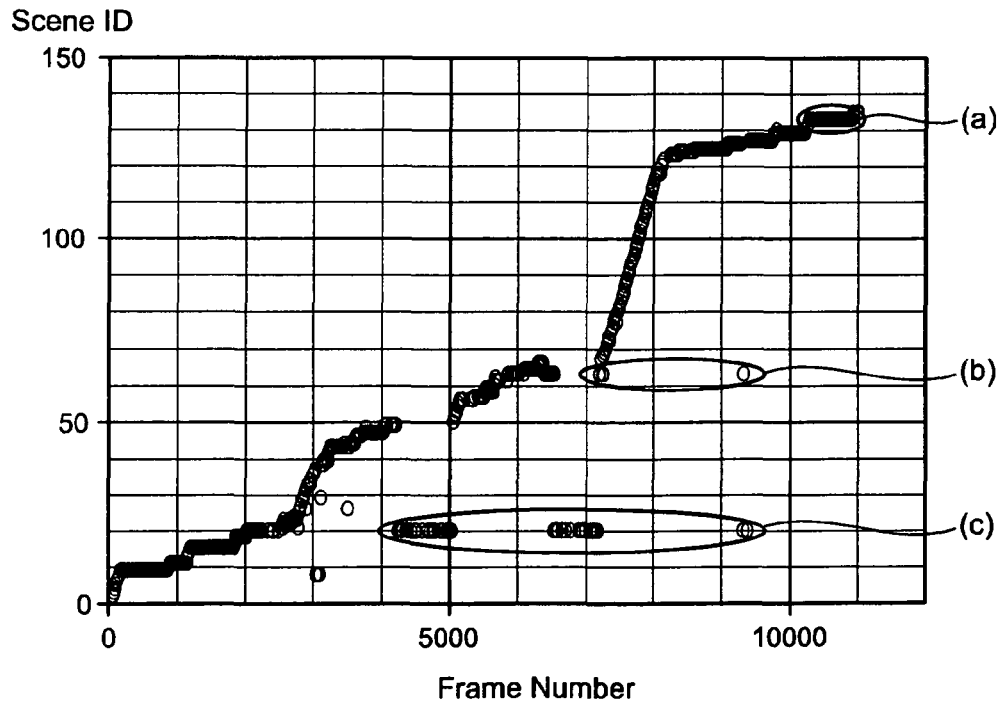
FIG. 26 is a graph showing a relationship between a scene ID output by ID processing and a frame number according to the embodiment of the present invention.

FIG. 26 is a graph showing a relationship between scene IDs output by the ID processing and the frame numbers.

As shown in Graphs (a), (b), and (c) of FIG. 26, for example, it can be seen that the same scene ID is assigned to successive frames and frames having a predetermined frame interval therebetween. The frames assigned with the same scene ID is treated as similar scenes to thus enable reproduction of highlight scenes and the like to be described later, for example.

FIG. 27 is a table showing judgment results of respective video features obtained by the camera feature judging section 36 and the fade/cut judging section 35. The CPU 1 controls to store data equivalent to the table in, for example, the RAM 2 or the HDD 10.

The table shows that the detection flags Dpan, Dtilt, Dzoom, Dbure, Dfade, and Dcut regarding the respective video features are all set to 1, and that the video features of pan, tilt, zoom, shake, fade, and cut have been detected from a detecting target video content. The CPU 1 creates the judgment result table for each video content.

As described above, the video feature detecting section 4 is capable of detecting the camera operational features of pan, tilt, zoom, and shake and the video editorial features of fade, cut, and similar scenes by using a common signal processing system. Specifically, based on the data on the basis blocks Bn extracted by the image processing section 21 and the data on the retrieval blocks Bm respectively stored in the inter-frame memory sections 22 to 25, the video feature detecting section 4 detects motion vectors between the respective frames by the block-matching processing carried out by the matching processing sections 26, 28, 30, and 32, and judges the camera operational features by the motion vector processing section 34 and the camera feature judging section 36. At the same time, based on the data on the basis blocks Bn and the data on the retrieval blocks Bm used in the block-matching processing, the video feature detecting section 4 generates fade/cut evaluation values by the fade/cut processing section 29, and analyzes the fade/cut evaluation values by the fade/cut judging section 35, thereby detecting the video editorial features of fade and cut. In addition, based on the basis blocks Bn and the retrieval blocks Bm respectively stored in the inter-frame memory sections 22 to 25, the scene ID processing section 37 detects a similar scene. Therefore, according to this embodiment, a system for detecting various video features can be easily structured at low costs, and detection efficiency can be improved.

Moreover, by detecting shake caused by a hand movement from among the camera operational features, it becomes possible to distinguish the video content recorded with the broadcast content from the video content shot by the home video camera as described above.

Next, descriptions will be given on combinations of video features of the video content from which video features have been detected as described above.

Figure 28:
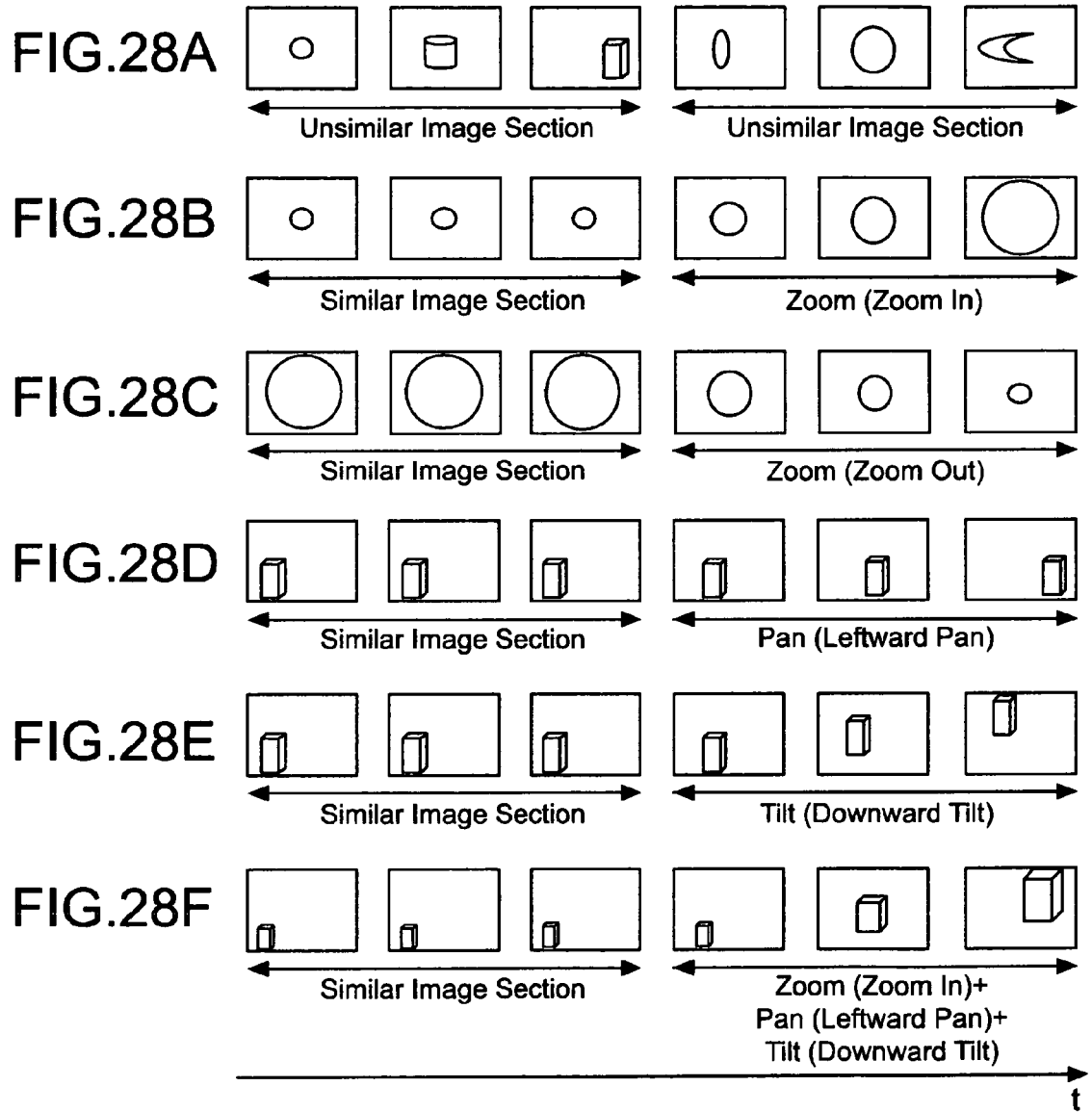
FIGS. 28 are diagrams each showing a combination of scene sections for each of the video features constituting a video content according to the embodiment of the present invention.

FIGS. 28 are diagrams showing combinations of scene sections for each video feature constituting a video content.

The video content is composed of several scenes sections. A scene change occurs between one scene section and the next. The scene change is caused by the detected fade or cut. Generally, the video content is composed of a similar image (frame) section and an image (frame) section including the detected camera operational feature. The similar image section is a section composed of frames whose detected IDs are the same. Further, there is also a rare video content composed of only the camera operational feature section and not including the similar image section.

FIG. 28A shows a case where a video content is composed of only the unsimilar image sections.

FIG. 28B shows a case where the video content is composed of the similar image section and a zoom-in section.

FIG. 28C shows a case where the video content is composed of the similar image section and a zoom-out section.

FIG. 28D shows a case where the video content is composed of the similar image section and a leftward-pan section.

FIG. 28E shows a case where the video content is composed of the similar image section and a downward-tilt section.

FIG. 28F shows a case where the video content is composed of the similar image section and a section including the leftward pan, zoom in, and downward tilt.

Figure 29:
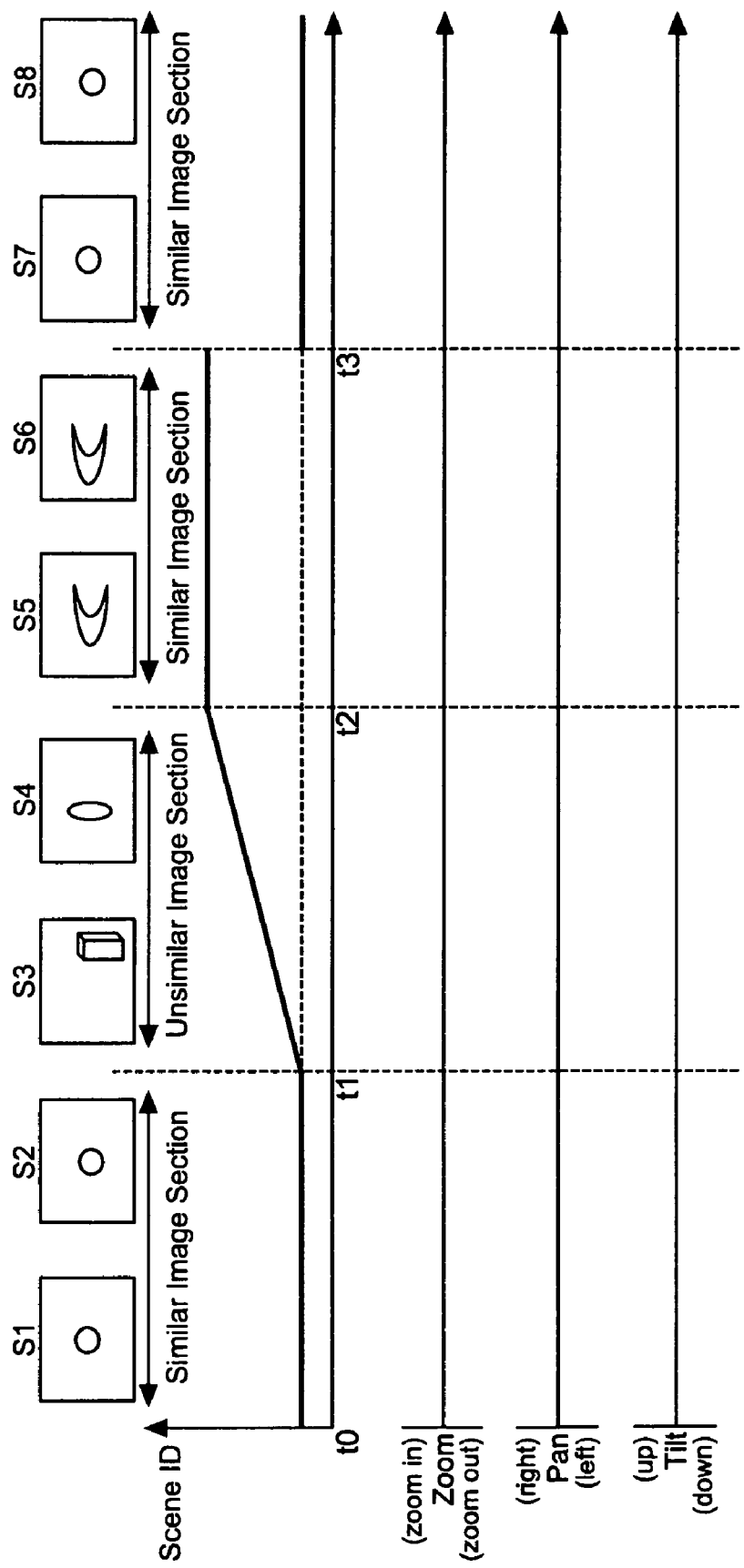
FIG. 29 is a diagram showing scene IDs of the respective video features and detection characteristics of respective camera operational features in a case where a video content is constituted by similar image sections and an unsimilar image section based on the case shown in FIG. 28A.

FIG. 29 is a diagram showing scene IDs of the respective video features and detection characteristics of the respective camera operational features in a case where the video content is composed of the similar image sections and the unsimilar image section based on the case shown in FIG. 28A.

As shown in the figure, Section t0-t1 is the similar image section with the same scene ID. Section t1-t2 is the unsimilar image section including different scene IDs, the value of the IDs becoming larger toward t2. Section t2-t3 is the similar image section but with different images from those of Section t0-t1 and accordingly with a different scene ID. A section from t3 and after is the similar image section with images similar to those of Section t0-t1 and accordingly with the same scene ID as that of Section t0-t1.

In this case, no camera operational feature is detected for all the sections, so the respective coefficients of pan, tilt, and zoom obtained by analyzing the affine coefficients become 0, or absolute values thereof become a predetermined threshold or lower.

Figure 30:
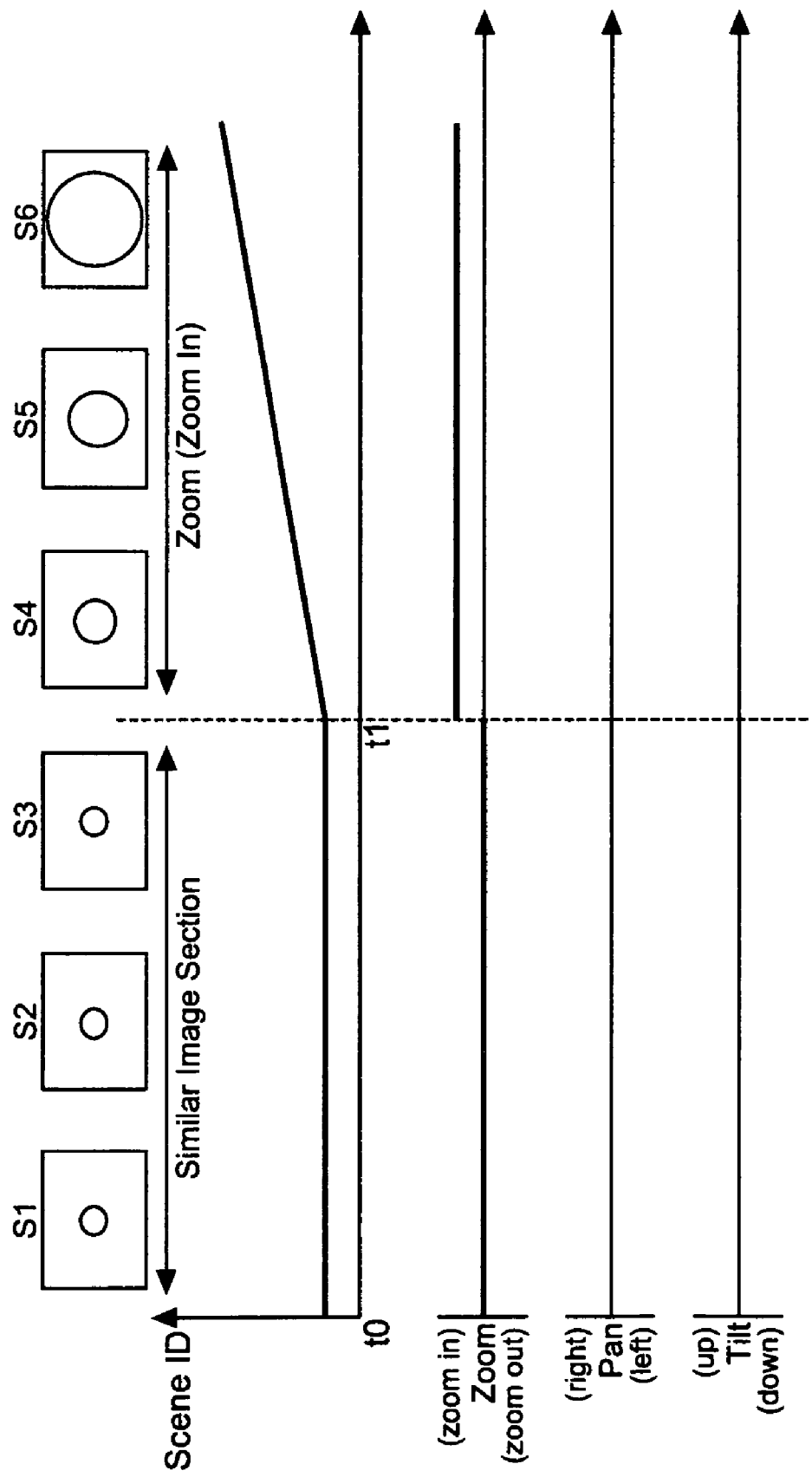
FIG. 30 is a diagram showing the scene IDs of the respective video features and detection characteristics of the respective camera operational features in the case shown in FIG. 28B.

FIG. 30 is a diagram showing the scene IDs of the respective video features and detection characteristics of the respective camera operational features in the case shown in FIG. 28B.

As shown in the figure, Section t0-t1 is the similar image section with the same scene ID. A section of t1 and after is the zoom-in section with different scene IDs, in which a zoom-in coefficient has been detected.

Figure 31:
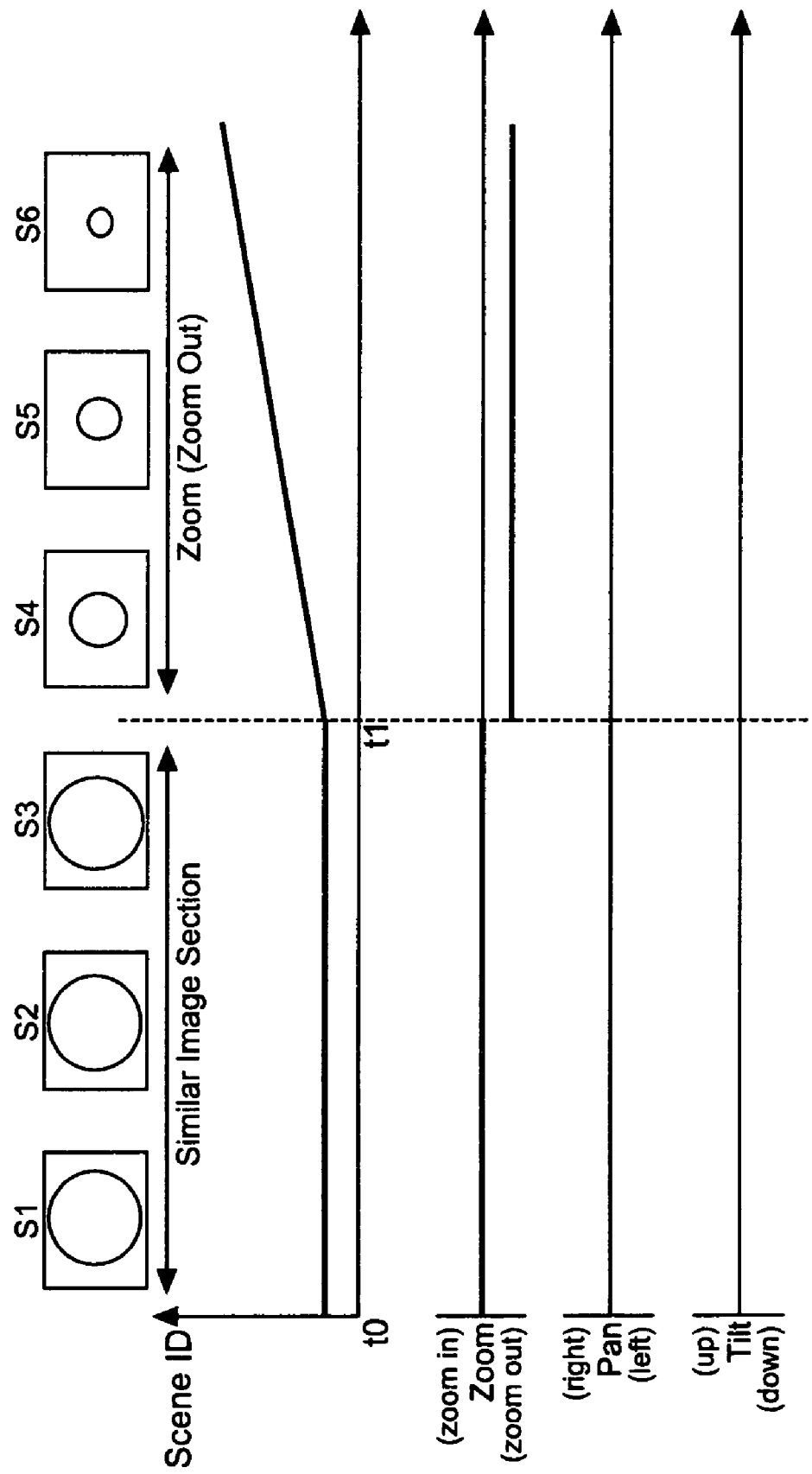
FIG. 31 is a diagram showing the scene IDs of the respective video features and detection characteristics of the respective camera operational features in the case shown in FIG. 28C.

FIG. 31 is a diagram showing the scene IDs of the respective video features and detection characteristics of the respective camera operational features in the case shown in FIG. 28C.

As shown in the figure, Section t0-t1 is the similar image section with the same scene ID. A section of t1 and after is the zoom-out section with different scene IDs, in which a zoom-out coefficient has been detected.

Figure 32:
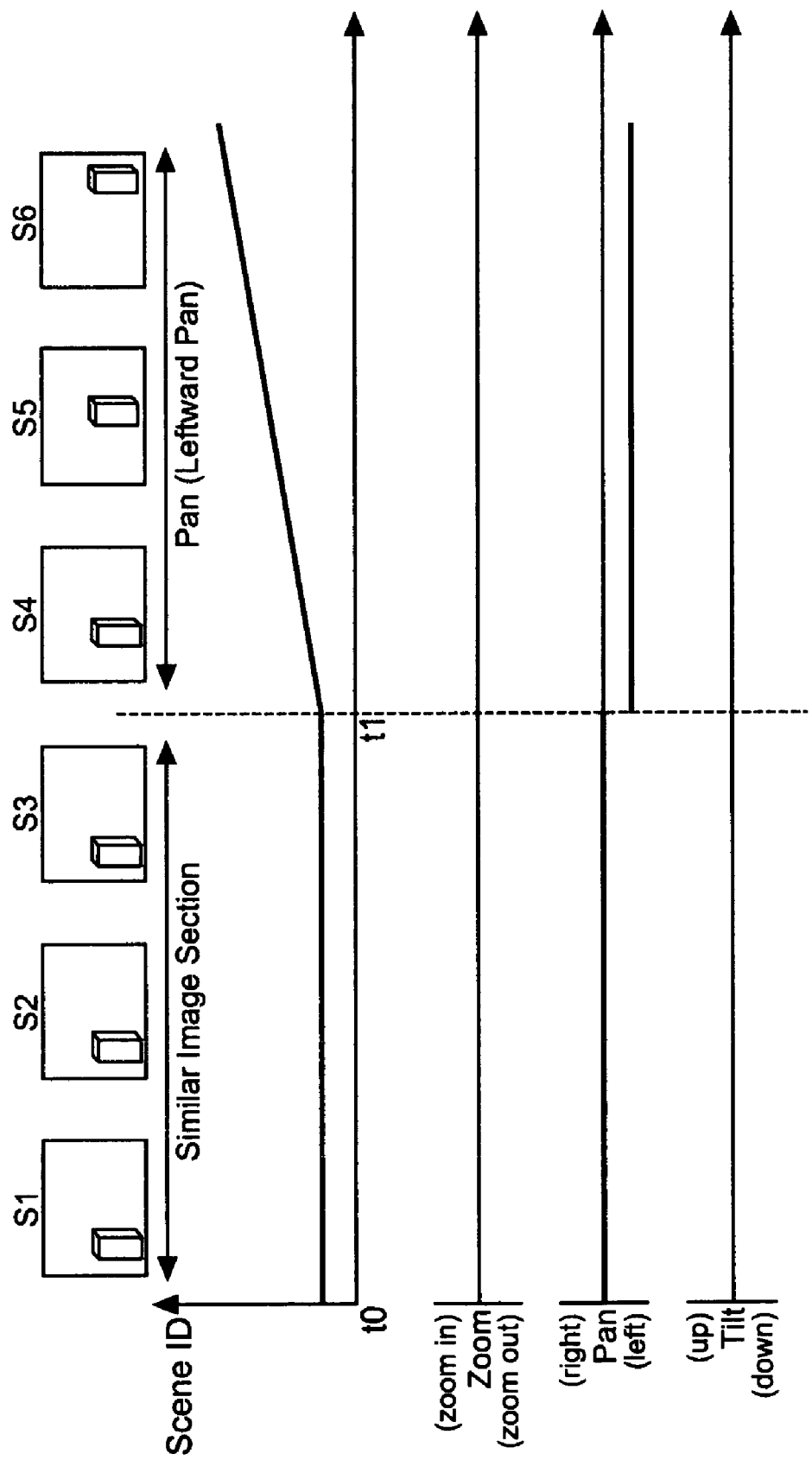
FIG. 32 is a diagram showing the scene IDs of the respective video features and detection characteristics of the respective camera operational features in the case shown in FIG. 28D.

FIG. 32 is a diagram showing the scene IDs of the respective video features and detection characteristics of the respective camera operational features in the case shown in FIG. 28D.

As shown in the figure, Section t0-t1 is the similar image section with the same scene ID. A section of t1 and after is the leftward-pan section with different scene IDS, in which a leftward-pan coefficient has been detected.

Figure 33:
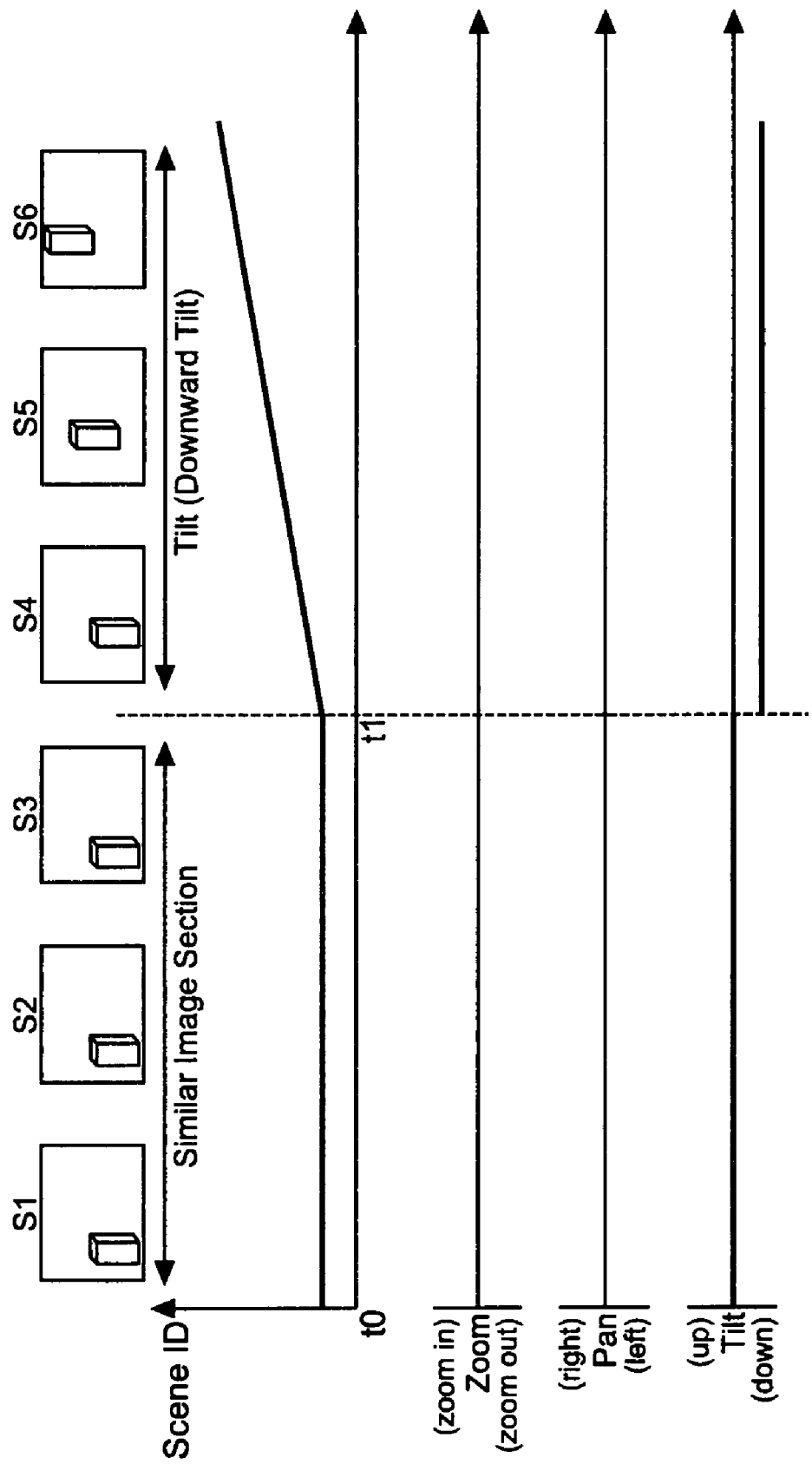
FIG. 33 is a diagram showing the scene IDs of the respective video features and detection characteristics of the respective camera operational features in the case shown in FIG. 28E.

FIG. 33 is a diagram showing the scene IDs of the respective video features and detection characteristics of the respective camera operational features in the case shown in FIG. 28E.

As shown in the figure, Section t0-t1 is the similar image section with the same scene ID. A section of t1 and after is the downward-tilt section with different scene IDS, in which a downward-tilt coefficient has been detected.

Figure 34:
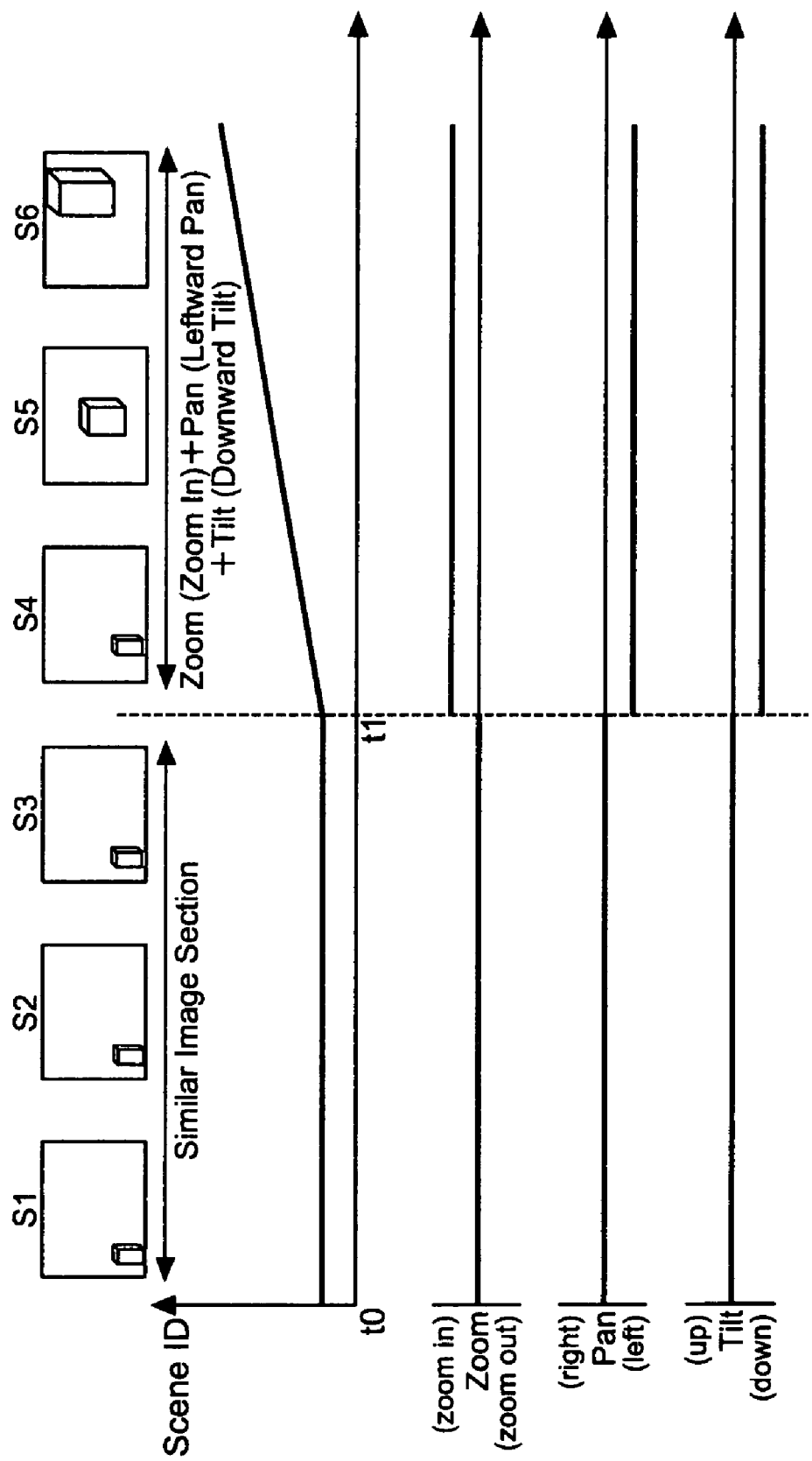
FIG. 34 is a diagram showing the scene IDs of the respective video features and detection characteristics of the respective camera operational features in the case shown in FIG. 28F.

FIG. 34 is a diagram showing the scene IDs of the respective video features and detection characteristics of the respective camera operational features in the case shown in FIG. 28F.

As shown in the figure, Section t0-t1 is the similar image section with the same scene ID. A section of t1 and after is the section in which the camera operational features of zoom in, leftward pan, and downward tilt have been detected simultaneously, the section having different scene IDS. The zoom-in, leftward-pan, and downward-tilt coefficients have been detected in this section.

As described above, by combining the video editorial features and the camera operational features detected by the common signal processing system, it becomes possible to organize scene sections within the video content.

Next, descriptions will be given on an exemplary application using the detected video features.

For example, the section in which the camera operational feature is detected is presumably a scene section shot with more emphasis of a photographer. Therefore, the recording/ reproducing apparatus 100 is capable of extracting, from the video content, a section from which the camera operational feature has been detected as a highlight scene to thus reproduce the scene.

Figure 35:
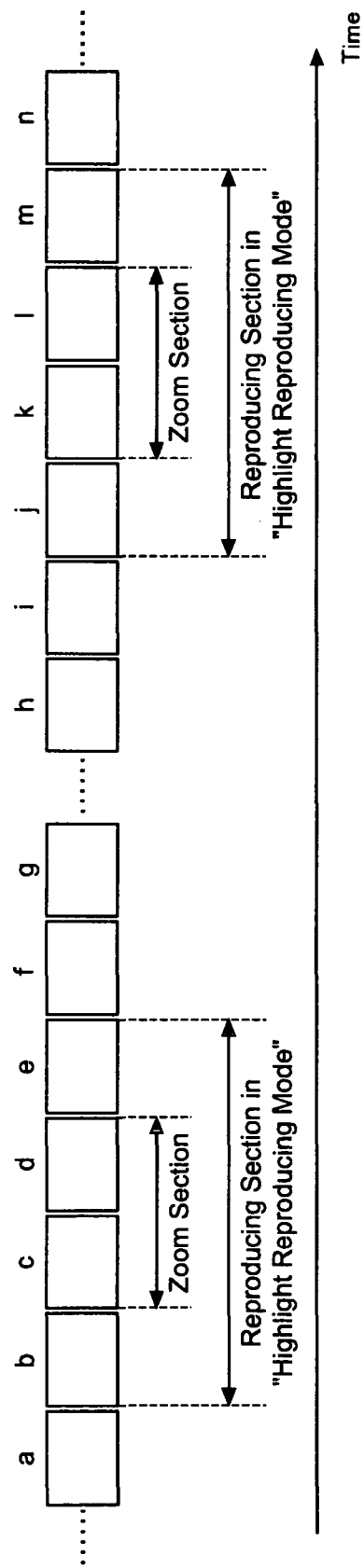
FIG. 35 is a diagram showing an example of highlight scene reproducing processing using a detected zoom feature according to the embodiment of the present invention.

FIG. 35 is a diagram showing an example of highlight scene reproducing processing. In the figure, the zoom section is taken as an example, but the same holds true for the pan and tilt sections.

As shown in the figure, when input with detection of a zoom feature from the camera feature judging section 36, for example, the CPU 1 extracts a plurality of detected zoom sections (frames c, d, k, and l) and predetermined sections before and after the respective detected sections (frames b, e, j, and m), and synthesizes those sections as a reproducible section in a "highlight reproducing model". Here, the reason for adding the sections before and after the respective zoom sections is that because specifics of scenes like the reason for zooming may not be grasped from only the zoom sections, it is necessary to set predetermined margins.

For example, regarding the video contents recorded on the HDD 10, the CPU 1 generates the highlight scene as a new content. Then, regarding the video contents in a content list displayed on a display in response to a request of the user, for example, the CPU 1 executes an application that allows the user to select, for example, a fully-reproducing mode and a highlight reproducing mode via the operation inputting section 3, to thus reproduce the content.

Figure 36:
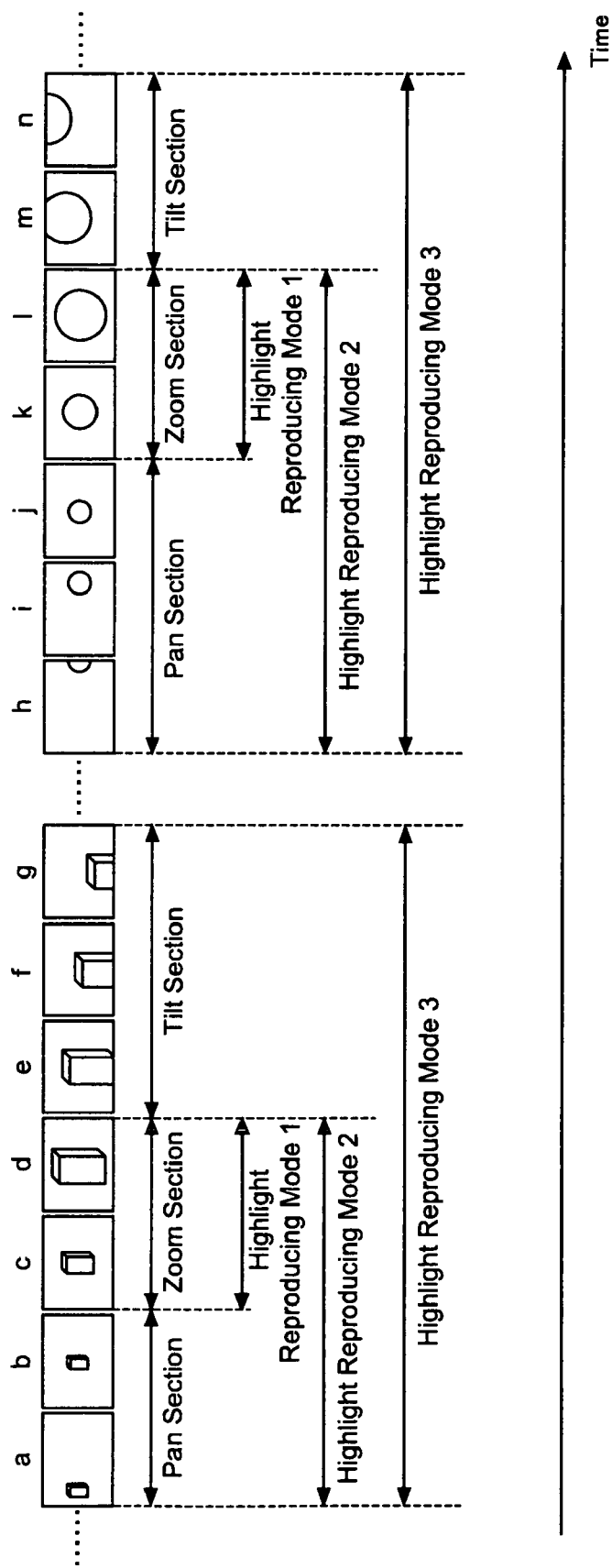
FIG. 36 is a diagram showing an example of the highlight scene reproducing processing using the detected camera operational features of pan, tilt, and zoom according to the embodiment of the present invention.

Further, instead of solely using each of the camera operational features of pan, tilt, and zoom, the CPU 1 is also capable of setting the highlight reproducing mode by combining the plurality of features. FIG. 36 is a diagram showing an example of the highlight scene reproducing processing in this case.

As shown in the figure, priority degrees are set to the respective camera operational features of pan, tilt, and zoom, and three highlight scenes different in reproducing time are generated.

In other words, the CPU 1 extracts only the zoom sections as the highlight scenes in a highlight reproducing mode 1 so that minimal highlight scenes are provided to the user in as short a time possible.

Further, the CPU 1 adds the pan sections to the respective zoom sections in a highlight reproducing mode 2 so that the highlight scenes are provided in a more detailed form although reproducing times are slightly elongated.

Then, the CPU 1 adds the tilt sections to the respective zoom sections and pan sections in a highlight reproducing mode 3 so that the highlight scenes are provided in a more detailed form although reproducing times are elongated additionally.

In selection of the highlight reproducing mode on the content list, the CPU 1 causes the respective modes to be selected at the same time.

By the processing described above, the detected camera operational features of pan, tilt, and zoom can be effectively used to reproduce the highlight scenes, thus enhancing convenience of the user.

Moreover, a shake feature among the camera operational features can be used for distinguishing the video contents from one another as described above.

For example, based on whether the shake detection flag Dbure is 1, the CPU 1 assigns different attributes to video contents recorded on the HDD 10 or the like, and categorizes the video contents into two categories. Accordingly, when the user requests display of the content list using the operation inputting section 3, for example, the CPU 1 can cause display of the content list for each category. Moreover, when the user searches for a content, the CPU 1 can also cause the category to be selected as a retrieval query. Accordingly, because the retrieval range of the video contents is narrowed, load of the retrieval processing can be alleviated and speed thereof can be increased.

Further, the fade and cut features among the video editorial features can be used for inserting a chapter in the video content. In other words, upon detection of the fade and cut, the CPU 1 inserts a chapter at a cut point in the video content recorded on the HDD 10 or the like, or at a midpoint between start and end points of fade, for example. Accordingly, the CPU 1 can speedily jump to a scene desired by the user and reproduce the scene.

The present invention is not limited to the above embodiment, and various modifications can of course be made without departing from the gist of the present invention.

Figure 37:
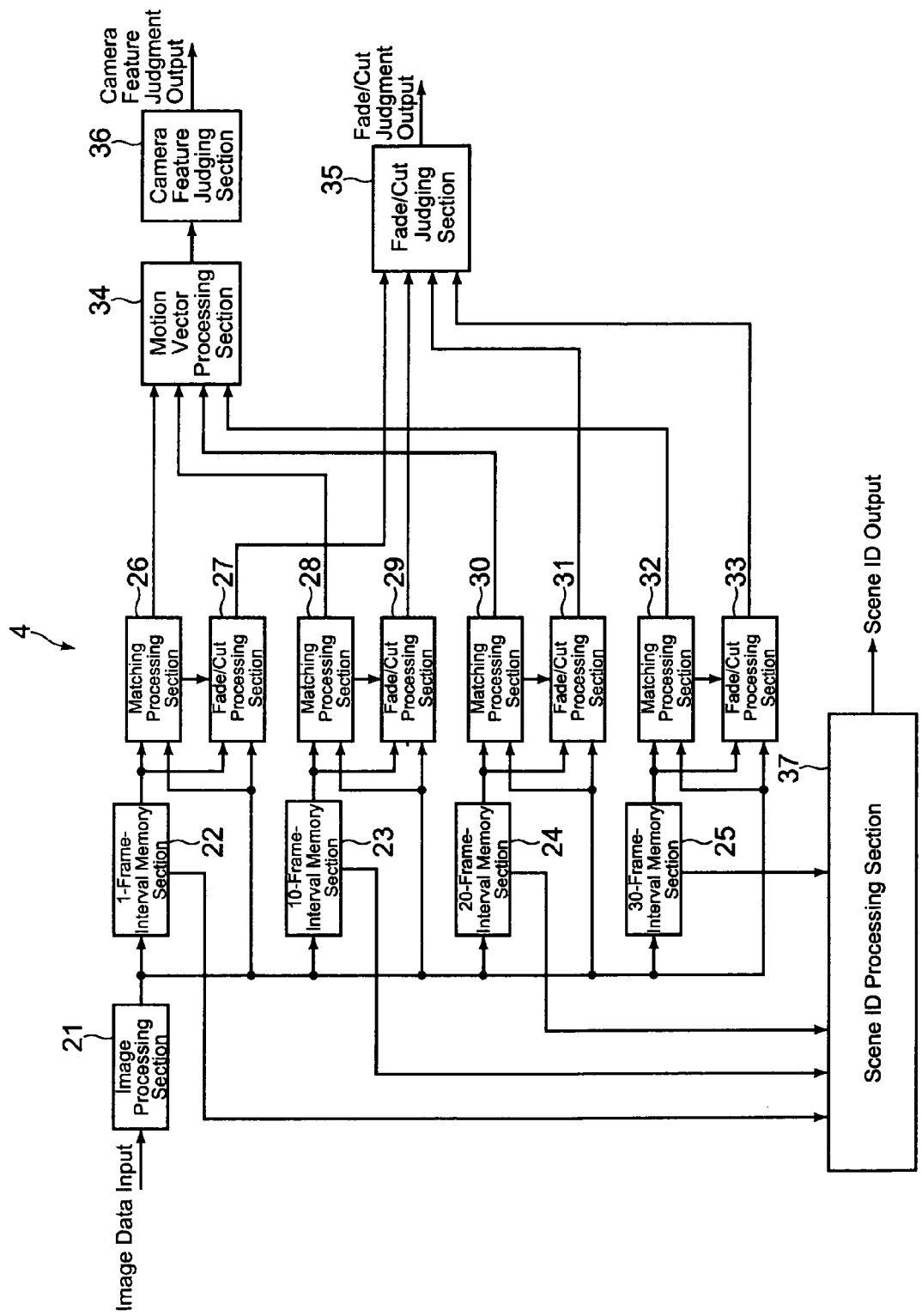
FIG. 37 is a diagram showing an example where a video feature detecting section is structured by connecting inter-frame memory sections in parallel according to another embodiment of the present invention.

In FIG. 7 of the above embodiment, the video feature detecting section 4 is structured by connecting the inter-frame memory sections 22 to 25 in series. However, video feature detecting section 4 may be structured by connecting the inter-frame memory sections 22 to 25 in parallel. FIG. 37 is a diagram showing a structure of the video feature detecting section 4 in this case. The thus structured video feature detecting section 4 executes the same processing as in the case where the inter-frame memory sections 22 to 25 are connected in series, and bears the same effect.

In the above embodiment, the image processing section 21 sets the two basis blocks Bn1 and Bn2 in the radial direction, each of which has a center placed on the half line expressed by the function Fn(x)=knx, that is, the half line starting from the center of the basis frame 71. However, the number of basis blocks Bn set radially is not limited to two, and three or more basis blocks Bn may of course be set.

In the above embodiment, the detection of the video features is carried out by detecting the motion vectors using the basis blocks Bn set radially. However, the motion vectors may be detected using the basis blocks set radially when carrying out compression coding processing of MPEG, for example.

Further, in the above embodiment, the video feature detecting section 4 sets the plurality of basis blocks Bn radially. However, even when a single basis block is set without combining the plurality of basis blocks Bn set radially, for example, the camera operational features and the video editorial features can still be detected by the same signal processing system. Also in this case, it is possible to set thresholds for the movement amounts and residual values in the block-matching processing, and not use inaccurate detection data in the motion vector estimating processing.

In the motion vector detecting processing carried out to detect the camera operational features by the video feature detecting section 4 in the above embodiment, thresholds for the movement amount and residual values are set, and inaccurate detection data is not used in the motion vector estimating processing. However, for example, in various types of processing for detecting the motion vector, such as compression coding processing of videos by MPEG, it is possible to use the thresholds respectively set for the movement amounts and the residual values to thus enhance accuracy in detecting the motion vectors.

In the above embodiment, the video feature detecting section 4 estimates the motion vector at the 40-frame interval based on the motion vectors detected at the respective frame intervals. However, the motion vector to be estimated is of course not limited to that at the 40-frame interval, and the motion vector may be estimated at any frame interval as long as the frame interval is longer than any of the frame intervals at which the motion vectors have been detected. It should be noted, however, that when the motion vector is estimated at a frame interval largely apart from those at which the motion vectors have been detected, a motion vector different from the original motion vector may be detected. Thus, the frame interval at which the motion vector is estimated is desirably set within a range not too far apart from those at which the motion vectors have been detected.

In the above embodiment, the video feature detecting section 4 judges the fade and cut by using the post-matching residual values as the fade/cut evaluation values. However, the video feature detecting section 4 may carry out judging processing using frequency analysis in addition to the judging processing using the fade/cut evaluation values.

Specifically, the fade/cut processing sections 27, 29, 31, and 33 carry out frequency analyzing processing through FFT (Fast Fourier Transform) processing, edge detecting processing, or the like, with respect to the basis frame 71 input from the image processing section 21 and the retrieval frames 75 respectively input from the inter-frame memory sections 22 to 25, and respectively output the results thereof to the fade/cut judging section 35. The fade/cut judging section 35 judges the fade and cut using both the fade/cut evaluation values and the results of the frequency analyzing processing. Because an image is made vague in the fade section, considering a frequency component, a feature with a high frequency component becomes small. Therefore, this feature can be used for judging the fade and cut.

For example, when a judgment value that is based on the fade/cut evaluation value is represented by f1 and a judgment value that is based on the frequency analysis is represented by f2, the fade/cut judging section 35 judges the fade and cut by setting an overall judgment value f of fade and cut as f=f1+f2. For example, the fade/cut judging section 35 sets a predetermined threshold for the judgment value f, and judges as fade when the judgment value f is larger than the threshold.

Accordingly, reliability in detecting fade and cut can be improved. Further, because the start and end points of the fade section is easily made ambiguous even when the fade is judged by the fade/cut evaluation values, reliability can be additionally improved by using the frequency analyzing processing together therewith.

In the above embodiment, the video feature detecting section 4 carries out the video feature detecting processing using the decoded signals of a baseband bandwidth of the respective frames of the video content. However, the video feature detecting section 4 may use pre-decoding encoded data instead of the decoded signals of the baseband bandwidth. For example, when the video content is encoded in the MPEG format or the DV format, instead of the signals of Y, Cb, and Cr, the video feature detecting section 4 can analyze a DC (Direct Current) coefficient from among DCT (Discrete Cosine Transform) coefficients to thus similarly detect the video features.

In the above embodiment, the recording/reproducing apparatus 100 to which the present invention is applied has been exemplified. However, the present invention can be applied to various electronic apparatuses such as a television apparatus, a PC, a cellular phone, and a game machine.

What is claimed is:

1. An electronic apparatus, comprising:
an extracting means for extracting a first block at a first position of a first frame image from among a plurality of frame images constituting video data;
a retrieving means for retrieving, from a retrieval region within a second frame image from among the plurality of frame images, a second block between which the first block has a smallest residual value, the second frame image and the first frame image having a first time length therebetween;
a detecting means for detecting a first motion vector between the first block and the second block; and
a controlling means for controlling the detecting means so that detection of the first motion vector is regulated when the second block is retrieved at a third position apart from the second position of the second frame image corresponding to the first position by a first threshold or more,
wherein extracting a first block comprises extracting a first basis block and a second basis block, the first basis block and second basis block being set in the radial direction from the center of the first frame image, and wherein retrieving a second block comprises retrieving a first retrieval block and a second retrieval block, the first retrieval block and second retrieval block being set in the radial direction from the center of the second frame image,
wherein the controlling means regulates the detection of the first motion vector when the second block is retrieved at the third position and the residual value is a second threshold or more,
wherein the retrieving means retrieves, from a retrieval region within a third frame image, a third block between which the first block has a smallest residual value, the third frame image and the first frame image having a second time length therebetween different from the first time length,
wherein the detecting means detects a second motion vector between the first block and the third block, and detects a motion feature within the video data based on the first motion vector and the second motion vector,
wherein the controlling means controls the detecting means so that, when the detection of the first motion vector is regulated, the motion feature is detected based on the second motion vector,
wherein the retrieving means retrieves, from a retrieval region within a fourth frame image, a fourth block between which the first block has a smallest residual value, the fourth frame image and the first frame image having a third time length therebetween different from the first time length and the second time length,
wherein the detecting means detects a third motion vector between the first block and the fourth block, estimates a fourth motion vector based on the first motion vector, the second motion vector, and the third motion vector, the fourth motion vector assumed to be detected within a fifth frame image between which the first frame image has a fourth time length longer than any of the first time length, the second time length, and the third time length, and detects the motion feature based on the estimated fourth motion vector, and
wherein the controlling means controls the detecting means so that, when the detection of the first motion vector is regulated, the fourth motion vector is estimated based on the second motion vector and the third motion vector.

2. The electronic apparatus according to claim 1,
wherein the detecting means includes
means for calculating a first gradient based on the first motion vector and the first time length,
means for calculating a second gradient based on the second motion vector and the second time length,
means for calculating a third gradient based on the third motion vector and the third time length,
means for calculating a fourth gradient by averaging the calculated first gradient, second gradient, and third gradient, and
means for estimating the fourth motion vector based on the calculated fourth gradient, and
wherein the controlling means controls the detecting means so that, when the detection of the first motion vector is regulated, the fourth gradient is calculated by averaging the second gradient and the third gradient.

3. The electronic apparatus according to claim 2, wherein the detecting means calculates the first gradient, the second gradient, and the third gradient as ratios of values respectively obtained by dividing the first time length, the second time length, and the third time length by a time length of the first frame image, with respect to the first motion vector, the second motion vector, and the third motion vector, respectively.

* * * * *